(12) United States Patent
Piramuthu et al.

(10) Patent No.: US 8,385,609 B2
(45) Date of Patent: Feb. 26, 2013

(54) IMAGE SEGMENTATION

(75) Inventors: Robinson Piramuthu, Oakland, CA (US); Daniel Prochazka, Pacifica, CA (US)

(73) Assignee: FlashFoto, Inc., Los Gatos, CA (US)

( * ) Notice: Subject to any disclaimer, the term of this patent is extended or adjusted under 35 U.S.C. 154(b) by 407 days.

(21) Appl. No.: 12/603,093

(22) Filed: Oct. 21, 2009

(65) Prior Publication Data

US 2010/0158325 A1   Jun. 24, 2010

Related U.S. Application Data

(60) Provisional application No. 61/107,296, filed on Oct. 21, 2008.

(51) Int. Cl.
*G06K 9/00*   (2006.01)

(52) U.S. Cl. ......... 382/118; 382/115; 382/164; 382/168

(58) Field of Classification Search .................. 382/118, 382/115, 164, 168
See application file for complete search history.

(56) References Cited

U.S. PATENT DOCUMENTS

| | | | |
|---|---|---|---|
| 6,697,502 B2 * | 2/2004 | Luo | 382/115 |
| 7,162,082 B2 * | 1/2007 | Edwards | 382/173 |
| 8,041,081 B2 * | 10/2011 | Hu | 382/118 |

OTHER PUBLICATIONS

R. Lienhart, Empirical Analysis of Detection Cascades of Boosted Classifiers for Rapid Object Detection, 2003.*
J. Brand and J. Mason, 2000, A Comparative Assessment of Three Approaches to Pixel-level skin-detection.*
Andreas Koschan, Mongi Abidi, Digital Color Image Processing, ISBN 978-0-470-14708-5, Published 2007.*
V. Vezhnevets, A. Andreeva, A Comparative Assessment of Pixel-Based Skin Detection Methods, 2005.*
NPL-2006—bin_Abdul_Rahman,_KC_Wei,_RGB-H-CbCr_Skin_Colour_Model_for_Human_Face_Detection.*

* cited by examiner

*Primary Examiner* — Chan S Park
*Assistant Examiner* — Ha Le

(57) ABSTRACT

Systems, methods, and computer readable media for forming a mugshot from a digital color image are provided in which a dominant face is determined using the digital color image. Person segmentation is also performed using the digital color image. An image and a mask are cropped based on the dominant face thereby forming a cropped image. Rough segmentation is performed on the cropped image. A mask is averaged in projection space based on the cropped image. The mask is refined mask and prepared for the mugshot.

20 Claims, 43 Drawing Sheets

5(a)

5(b)

5(c)

5(d)

5(e)

7(a)

7(b)

7(c)

7(d)

7(e)

9(a)

9(b)

9(c)

9(d)

14(a)

14(b)

14(c)

14(d)

17(a) 17(b)

18(a)          18(b)

22(a)

22(b)

22(c)

22(d)

22(e)

22(f)

24(a)          24(b)

25(a)            25(b)

26(a)            26(b)

IMAGE SEGMENTATION

CROSS-REFERENCE TO RELATED APPLICATION

This application claims priority to U.S. Patent Application No. 61/107,296, entitled "Systems And Methods For Segmenting An Image Of A Person To Produce A Mugshot," filed Oct. 21, 2008, which is hereby incorporated by reference herein in its entirety.

FIELD

Systems and methods for segmenting an image of a person to produce a mugshot are provided.

BACKGROUND

Though many people are currently trying to create methods for enabling a computer to accurately determine the foreground of an image, a method which would perform such a task has proven elusive. There have been a few that have come up with solutions (See e.g., Yu and Shi, "Object-Specific Figure-Ground Segmentation", 2003 IEEE Computer Society Conference on Computer Vision and Pattern Recognition, Proceedings, Volume 2, pages 39-45, which is hereby incorporated by reference herein in its entirety), but even those solutions aren't broad enough to solve the general problem of creating a system or method which would run effectively on any image. Even with the advancements of artificial intelligence, satisfactory solutions for having a computer automatically determine the "figure" and "ground" (according to the definitions in psychology literature or as defined by Gestalt rules of perception). The application of encoding human perception into machine readable code has proven to be a very difficult task.

One method for having a computer represent its results for determining the foreground of an image is to direct the computer to segment out the foreground from an image. With the advancement and cost effectiveness of digital photography, many more digital images are being created than ever before. Many of these newly created digital images are taken of a person or people, whereby the person or people are arguably in the foreground of the image. Person or people segmentation from an entire image is currently a popular research topic in the field of computer vision. Most of the segmentation approaches rely heavily on training sets and accuracy of probabilistic models. Such approaches have the drawback of being computational and memory intensive. They are also sensitive to model mismatch since they are based on heavy assumptions. Some examples of model based approaches are: (1) "Efficient matching of pictorial structures," P. F. Felzenszwalb, D. P. Huttenlocher, Proceedings of the IEEE Conference on Computer Vision and Pattern Recognition, vol. 2, pp. 66-73, 2000; (2) "Probabilistic methods for finding people," S. Ioffe, D. A. Forsyth, International Journal of Computer Vision, vol. 43, issue 1, pp. 45-68, 2001; (3) "Simultaneous detection and segmentation of pedestrians using top-down and bottom-up processing," V. Sharma, J. W. Davis, Proceedings of the IEEE Conference on Computer Vision and Pattern Recognition, pp. 1-8, June 2007; (4) "Bottom up recognition and parsing of the human body," P. Srinivasan, J. Shi, Proceedings of the IEEE Conference on Computer Vision and Pattern Recognition, pp. 1-8, June 2007; and (5) "Detecting and segmenting humans in crowded scenes," M. D. Rodriguez, M. Shah, Proceedings of the 15$^{th}$ International Conference on Multimedia, pp. 353-356, 2007.

Rule-based systems, such as decision trees, are more popular in detection and retrieval than segmentation applications. Rule-based systems use several thresholds (hard versus soft decisions) which may pose robustness issues. However, clever choices for parameters to threshold and when the parameter threshold (early or later in the decision tree) occurs can mitigate the robustness problems. Also, hierarchical rule-based systems are not as prone to the problems that can occur in high dimensional systems with model-based approaches. Rule-based systems are more forgiving to mismatch in assumptions than model-based systems. As should be apparent, there is a long-felt and unfulfilled need to provide improved techniques for rule-based segmentation for a person or people in color images.

Further, a "mugshot" of a person or persons, wherein a mugshot involves segmentation of an image to comprise the face and upper torso of a person or persons, would serve many commercial applications. Such applications include those for creating memorabilia for loved ones. As should be apparent, there is an unfulfilled need in the image segmentation market for systems and methods for automated segmenting of an image with a person or persons to get a mugshot.

BRIEF DESCRIPTION OF DRAWINGS

The accompanying drawings, which are included as part of the present specification, illustrate the presently preferred embodiments and together with the general description given above and the detailed description of the preferred embodiments given below serve to explain and teach the principles of the present invention.

Figure 1:
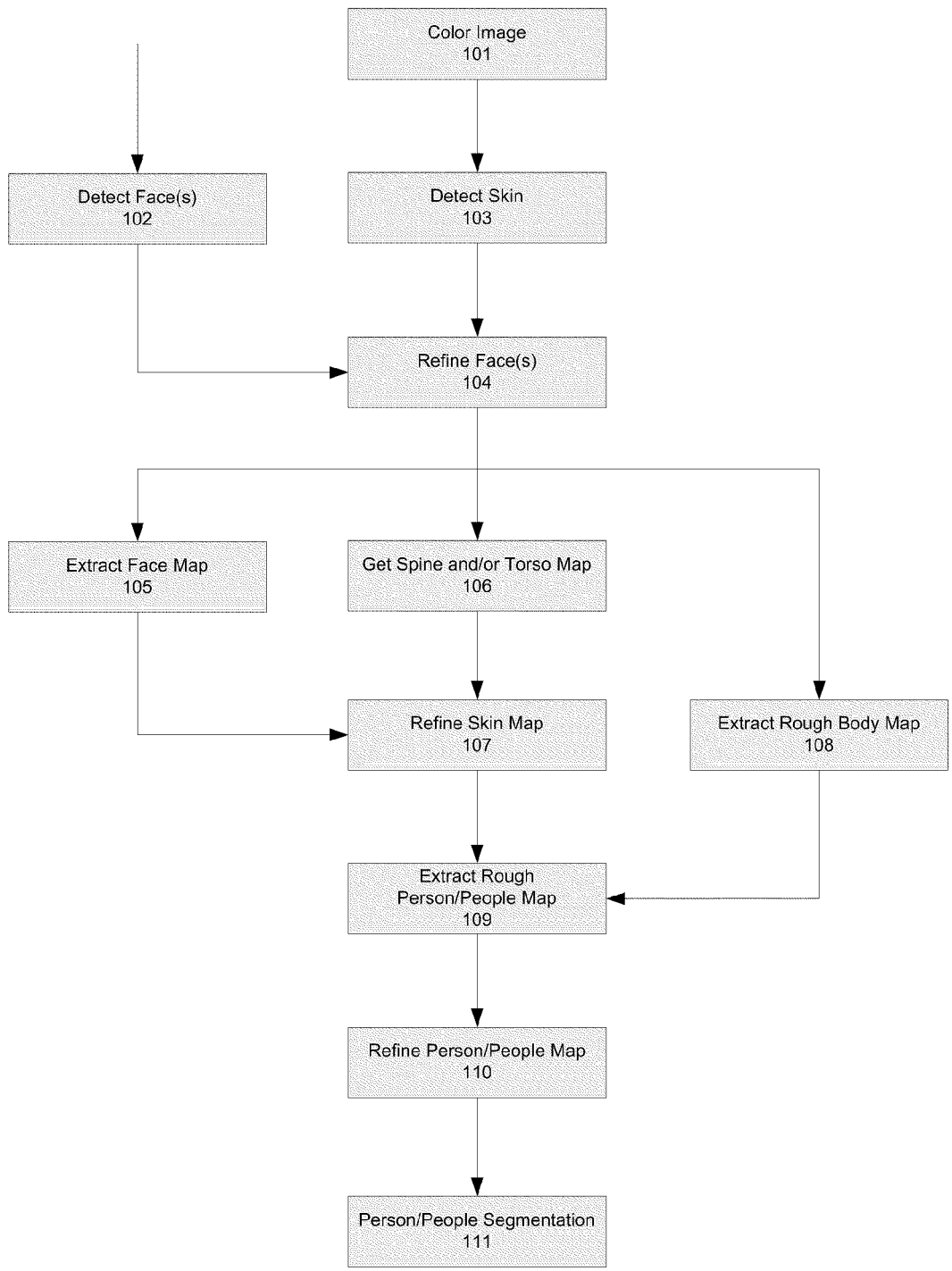
FIG. 1 is a diagrammatic illustration of a system, process or method for rule-based segmentation for vertical person or people with full or partial frontal view in color images, according to one embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not illustrate every aspect of the disclosed embodiments and do not limit the scope of the disclosure.

DETAILED DESCRIPTION

System for segmenting an image of a person to produce a mugshot and methods for making and using same.

In the following description, for purposes of explanation, specific nomenclature is set forth to provide a thorough understanding of the various inventive concepts disclosed herein. However it will be apparent to one skilled in the art that these specific details are not required in order to practice the various inventive concepts disclosed herein.

Some portions of the detailed description that follow are presented in terms of processes and symbolic representations of operations on data bits within a computer memory. These process descriptions and representations are the means used by those skilled in the data processing arts to most effectively convey the substance of their work to others skilled in the art.

A process is here, and generally, conceived to be a self-consistent sequence of sub-processes leading to a desired result. These sub-processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The disclosed embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a tangible computer readable storage medium, such as, but not limited to, any type of disk, including floppy disks, optical disks, CD-ROMS, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct more specialized apparatus to perform the required method sub-processes. The required structure for a variety of these systems will appear from the description below. In addition, the disclosed embodiments are not described with reference to any particular programming language. It will be appreciated that a variety of programming languages may be used to implement the teachings of the disclosed embodiments.

In some embodiments an image is a bitmapped or pixmapped image. As used herein, a bitmap or pixmap is a type of memory organization or image file format used to store digital images. A bitmap is a map of bits, a spatially mapped array of bits. Bitmaps and pixmaps refer to the similar concept of a spatially mapped array of pixels. Raster images in general may be referred to as bitmaps or pixmaps. In some embodiments, the term bitmap implies one bit per pixel, while a pixmap is used for images with multiple bits per pixel. One example of a bitmap is a specific format used in Windows that is usually named with the file extension of .BMP (or .DIB for device-independent bitmap). Besides BMP, other file formats that store literal bitmaps include InterLeaved Bitmap (ILBM), Portable Bitmap (PBM), X Bitmap (XBM), and Wireless Application Protocol Bitmap (WBMP). In addition to such uncompressed formats, as used herein, the term bitmap and pixmap refers to compressed formats. Examples of such bitmap formats include, but are not limited to, formats, such as JPEG, TIFF, PNG, and GIF, to name just a few, in which the bitmap image (as opposed to vector images) is stored in a compressed format. JPEG is usually lossy compression. TIFF is usually either uncompressed, or losslessly Lempel-Ziv-Welch compressed like GIF. PNG uses deflate lossless compression, another Lempel-Ziv variant. More disclosure on bitmap images is found in Foley, 1995, Computer Graphics: Principles and Practice, Addison-Wesley Professional, p. 13, ISBN 0201848406 as well as Pachghare, 2005, Comprehensive Computer Graphics: Including C++, Laxmi Publications, p. 93, ISBN 8170081858, each of which is hereby incorporated by reference herein in its entirety.

In typical uncompressed bitmaps, image pixels are generally stored with a color depth of 1, 4, 8, 16, 24, 32, 48, or 64 bits per pixel. Pixels of 8 bits and fewer can represent either grayscale or indexed color. An alpha channel, for transparency, may be stored in a separate bitmap, where it is similar to a greyscale bitmap, or in a fourth channel that, for example, converts 24-bit images to 32 bits per pixel. The bits representing the bitmap pixels may be packed or unpacked (spaced out to byte or word boundaries), depending on the format. Depending on the color depth, a pixel in the picture will occupy at least n/8 bytes, where n is the bit depth since 1 byte equals 8 bits. For an uncompressed, packed within rows, bitmap, such as is stored in Microsoft DIB or BMP file format, or in uncompressed TIFF format, the approximate size for a n-bit-per-pixel (2n colors) bitmap, in bytes, can be calculated as: size≈width×height×n/8, where height and width are given in pixels. In this formula, header size and color palette size, if any, are not included. Due to effects of row padding to align each row start to a storage unit boundary such as a word, additional bytes may be needed.

In computer vision, segmentation refers to the process of partitioning a digital image into multiple regions (sets of pixels). The goal of segmentation is to simplify and/or change the representation of an image into something that is more meaningful and easier to analyze. Image segmentation is typically used to locate objects and boundaries (lines, curves, etc.) in images.

The result of image segmentation is a set of regions that collectively cover the entire image, or a set of contours extracted from the image. Each of the pixels in a region share a similar characteristic or computed property, such as color, intensity, or texture. Adjacent regions are significantly different with respect to the same characteristic(s).

Several general-purpose algorithms and techniques have been developed for image segmentation. Exemplary segmentation techniques are disclosed in *The Image Processing Handbook*, Fourth Edition, 2002, CRC Press LLC, Boca Raton, Fla., Chapter 6, which is hereby incorporated by reference herein for such purpose. Since there is no general solution to the image segmentation problem, these techniques often have to be combined with domain knowledge in order to effectively solve an image segmentation problem for a problem domain.

In some embodiments, a segmentation technique used in accordance with the present invention is a watershed transform. The watershed transform considers the gradient magnitude of an image as a topographic surface. Pixels having the highest gradient magnitude intensities (GMIs) correspond to watershed lines, which represent the region boundaries. Water placed on any pixel enclosed by a common watershed line flows downhill to a common local intensity minima (LMI). Pixels draining to a common minimum form a catchment basin, which represent the regions.

FIG. 1 is a diagrammatic illustration of a system, process or method for rule-based segmentation for vertical person or people with full or partial frontal view in color images, according to one embodiment of the present invention. Throughout the present description of the invention described herein, all steps or tasks will be described using this one embodiment. However, it will be apparent to one skilled in the art, that the order of the steps described could change in certain areas, and that the embodiment is used for illustrative purposes and for the purpose of providing understanding of the inventive properties of the invention. Bottom-up approach is used during earlier stages and simple top-down cues are introduced as the stages progress. The systems and methods are designed to segment a person or people whose both eyes are visible and whose orientation it vertical.

Figure 27:
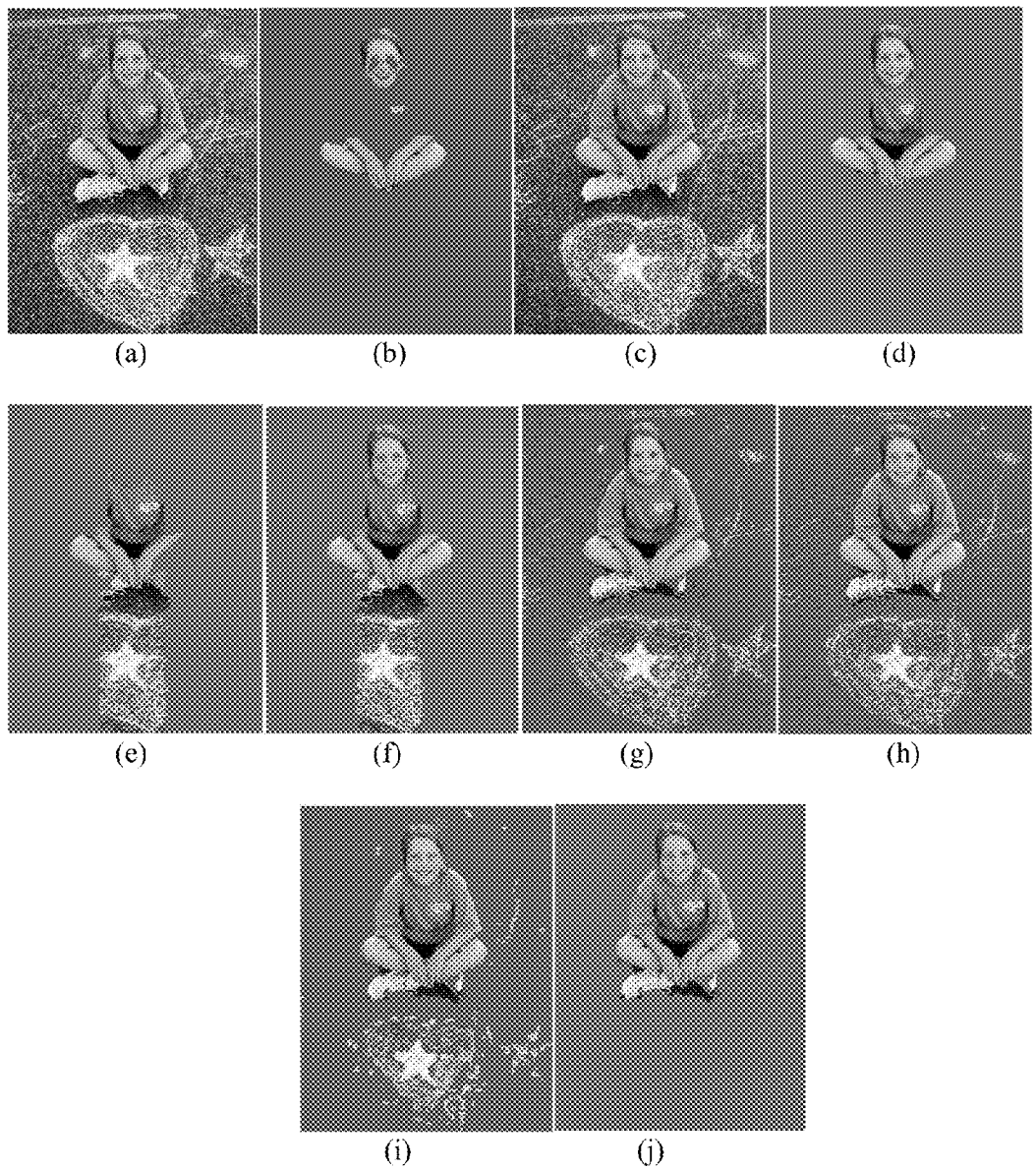
FIG. 27 and FIG. 28 illustrate rough people segmentation derived from maps, which are then refined using a projection step followed by refinements using color, size and distance of JigCut regions
Figure 28:
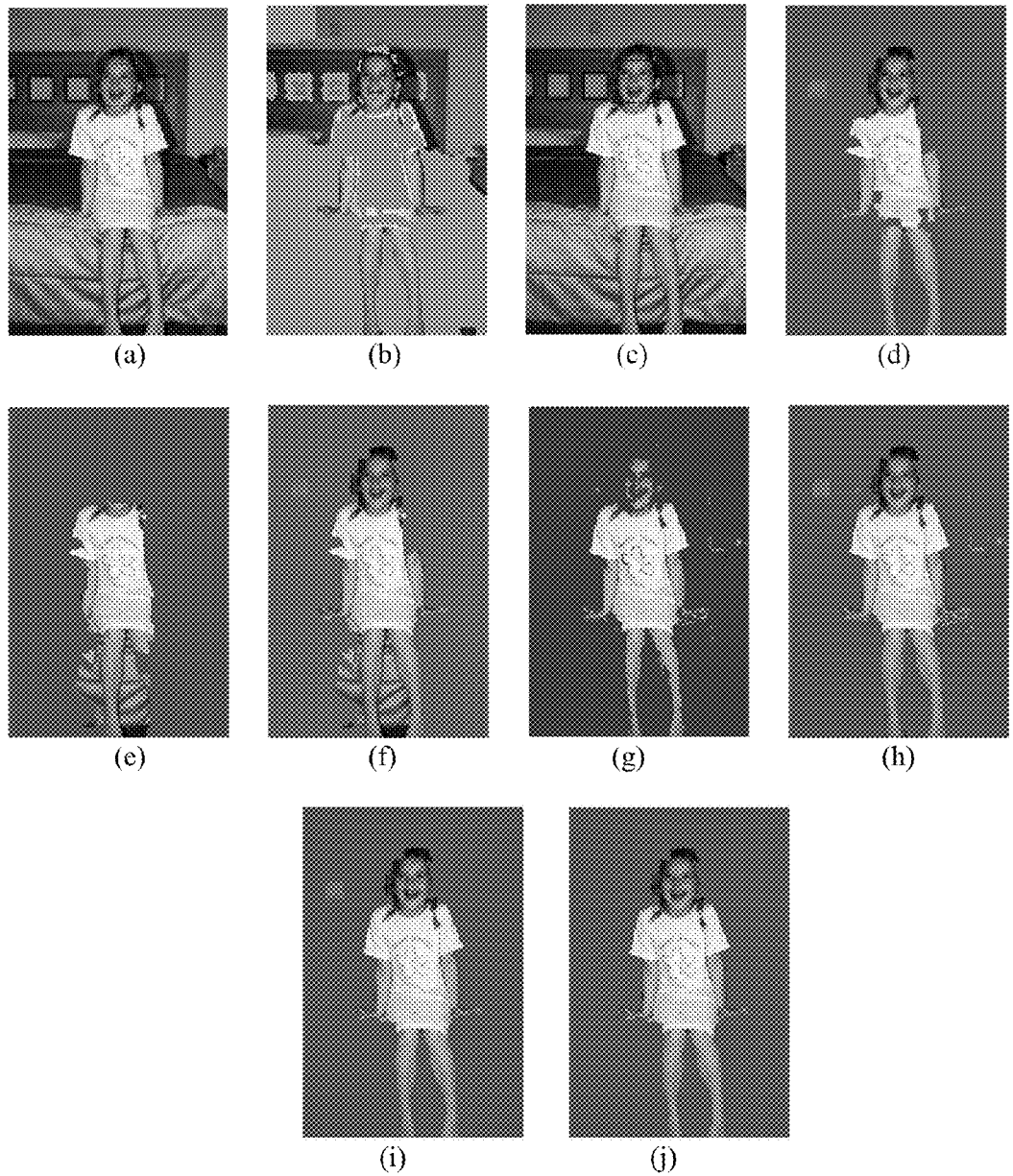

Generally, in the embodiment described in FIG. 1, faces are detected using a robust Haar-based classifier (see "Empirical analysis of detection cascades of boosted classifiers for rapid object detection", R. Lienhart, A. Kuranov, V. Pisarevsky, MRL Technical Report, Intel Labs, May 2002, which is hereby incorporated by reference herein) which operates only on the luminance channel. This face detector is a hierarchical rule-based system where the rules were created based on performance on a set of training images. However, it should be apparent to one of skill in the art that any face detector which would perform the functions needed for the present invention could be used. Color information is used during skin detection. During this step, a model was created for detecting skin and non-skin pixels. Face, spine/torso, body maps are obtained using JigCut regions, face locations and weak templates. JigCut regions are defined in "System and Method for Moving Pixels of an Image from a First Layer to a Second Layer and an Improved Display of Tuned Multi-Scaled Regions of an Image," Provisional Patent Pending, Application Number 60909918 (which is hereby incorporated by reference herein in its entirety). Rough people segmentation is derived from these maps, which is later refined using a projection step followed by refinements using color, size and distance of JigCut regions. Examples can be found in the following descriptions and two additional examples are given in FIG. 27 and FIG. 28.

In FIG. 1, a digital color image 101 is processed by detecting a face or faces 102 and detecting skin 103. Detection of skin 103 is pixel-based. A report that compares various pixel-based approaches can be found in "A Comparative Assessment of Pixel-Based Skin Detection Methods", V. Vezhnevets, A. Andreeva, Technical Report, Graphics and Media Laboratory, 2005, which is hereby incorporated by reference herein in its entirety. This report compares non-parametric and parametric pixel-based approaches and contains several references. The most popular non-parametric approach is to generate color histograms for skin as well as non-skin pixels and then apply the classic Likelihood Ratio Test (LRT). The most popular parametric approach is to model skin pixels by a single Gaussian or a mixture of Gaussians. It is normal to model this Gaussian in 2-D or 3-D color space. As mentioned on page 12 of Vezhnevets and Andreeva, all parametric methods only model skin and ignore non-skin pixels.

The present invention utilizes two different approaches. In one of these approaches, a parametric model is utilized for skin as well as non-skin pixels. Models were generated using a corpus for which skin-pixels were identified manually. Both skin detection approaches use a mixture of experts. The concept of mixture of experts is well known in other applications of object classification, pattern recognition and regression analysis. The general idea is to make final classification based on decisions by several independent experts See for example, Jacobs, R. A., Jordan, M. I., Nowlan, S. J., & Hinton, G. E. (1991), "Adaptive mixtures of local experts, Neural Computation, 3, 79-87, which is hereby incorporated by reference herein. A similar scheme is utilized for skin detection.

One approach that can be used in the present invention is geometric mean. This approach is used as the first pass for skin detection. A 2-D Gaussian model is generated for skin-pixels and another for non-skin pixels. The probability of skin and non-skin is evaluated for each pixel, based on the values of $C_b$ and $C_r$. The complement of non-skin probability is treated as another estimate for skin probability. These two estimates are the results from two experts. A threshold is applied to the geometric mean of these estimates to get a binary skin map. Model parameters and the decision rule are shown below:

$$\mu_{skin} = \begin{bmatrix} 0.4402 \\ 0.5863 \end{bmatrix}, \Sigma_{skin} = \begin{bmatrix} 0.9026e-3 & -0.7318e-3 \\ -0.7318e-3 & 1.1871e-3 \end{bmatrix}$$

$$\mu_{nonskin} = \begin{bmatrix} 0.4817 \\ 0.5220 \end{bmatrix}, \Sigma_{nonskin} = \begin{bmatrix} 2.2891e-3 & -1.4160e-3 \\ -1.4160e-3 & 3.0662e-3 \end{bmatrix}$$

$$f(\underline{x}; \underline{\mu}, \Sigma) = e^{-0.5(\underline{x}-\underline{\mu})^T \Sigma^{-1}(\underline{x}-\underline{\mu})}$$

$$SkinMap = 1, \text{ when } \sqrt{\frac{f(x_{C_b C_r}; \mu_{skin}, \Sigma_{skin}) *}{(1 - f(x_{C_b C_r}; \mu_{nonskin}, \Sigma_{nonskin}))}} > 0.16 \quad \text{Equation 1}$$

$$= 0, \text{ otherwise}$$

Another approach utilized is logical OR. This approach is used as a second pass for skin detection during the refinement of faces 104 (after gamma correction). It uses a mixture of experts to classify each pixel as skin or not. Each expert is a parametric model for skin in a particular color space. Non-skin model is not used. In some embodiments, there are three experts operating in the following 2-D color spaces: Tint-Saturation (from TSL), $C_b$-$C_r$ (from $YC_bC_r$) and a-b (from CIE-Lab). Model parameters are:

Expert 1: Tint-Saturation (from TSL color space)

$$\mu_{skin} = \begin{bmatrix} 0.5347 \\ 0.1637 \end{bmatrix}, \Sigma_{skin} = \begin{bmatrix} 1.2522e-3 & 0.2543e-3 \\ 0.2543e-3 & 7.3680e-3 \end{bmatrix}, \gamma_{skin} = 0.5$$

Expert 2: $C_b$-$C_r$ (from $YC_bC_r$ color space)

$$\mu_{skin} = \begin{bmatrix} 0.4402 \\ 0.5863 \end{bmatrix},$$

$$\Sigma_{skin} = \begin{bmatrix} 0.9026e-3 & -0.7318e-3 \\ -0.7318e-3 & 1.1871e-3 \end{bmatrix},$$

$$\gamma_{skin} = 0.4$$

Expert 3: a-b (from CIE-Lab color space with CIE standard illuminant D50)

$$\mu_{skin} = \begin{bmatrix} 16.9457 \\ 19.2031 \end{bmatrix}, \Sigma_{skin} = \begin{bmatrix} 60.2286 & 36.7229 \\ 36.7229 & 87.2707 \end{bmatrix}, \gamma_{skin} = 0.4$$

Each expert classifies skin pixels by applying a threshold to the skin probability as follows:

$$SkinMap_{expert} = 1, \text{ when } f(x; \mu_{skin}, \Sigma_{skin}) > \gamma_{skin}$$
$$= 0, \text{ otherwise}$$

A pixel is classified as a skin pixel if it is detected by any of the above experts.

$$SkinMap = SkinMap_{expert1} \lor SkinMap_{expert2} \lor SkinMap_{expert3} \quad \text{Equation 2}$$

Many approaches exist for face detection 102. See, for example, "Recent advances in face detection," M-H. Yang, a tutorial on "Advances in Face Processing: Detection" at the International Conference on Pattern Recognition, 2004, which is hereby incorporated by reference herein, for a survey. See also the Haar-based boosted classifier in "Rapid object detection using a boosted cascade of simple features," P. Viola, M. J. Jones, Proceedings of Computer Vision and Pattern recognition, vol. 1, pp. 511-518, 2001, which is hereby incorporated by reference herein. The classifier by Rainer Lienhart "Empirical analysis of detection cascades of boosted classifiers for rapid object detection", R. Lienhart, A. Kuranov, V. Pisarevsky, MRL Technical Report, Intel Labs, May 2002, which is hereby incorporated by reference herein, is available in OpenCV, an open source site for computer vision algorithms. It uses a cascaded boosted classifier as well. The input to this face detector is the luminance image. Color information is not used.

Figure 2:
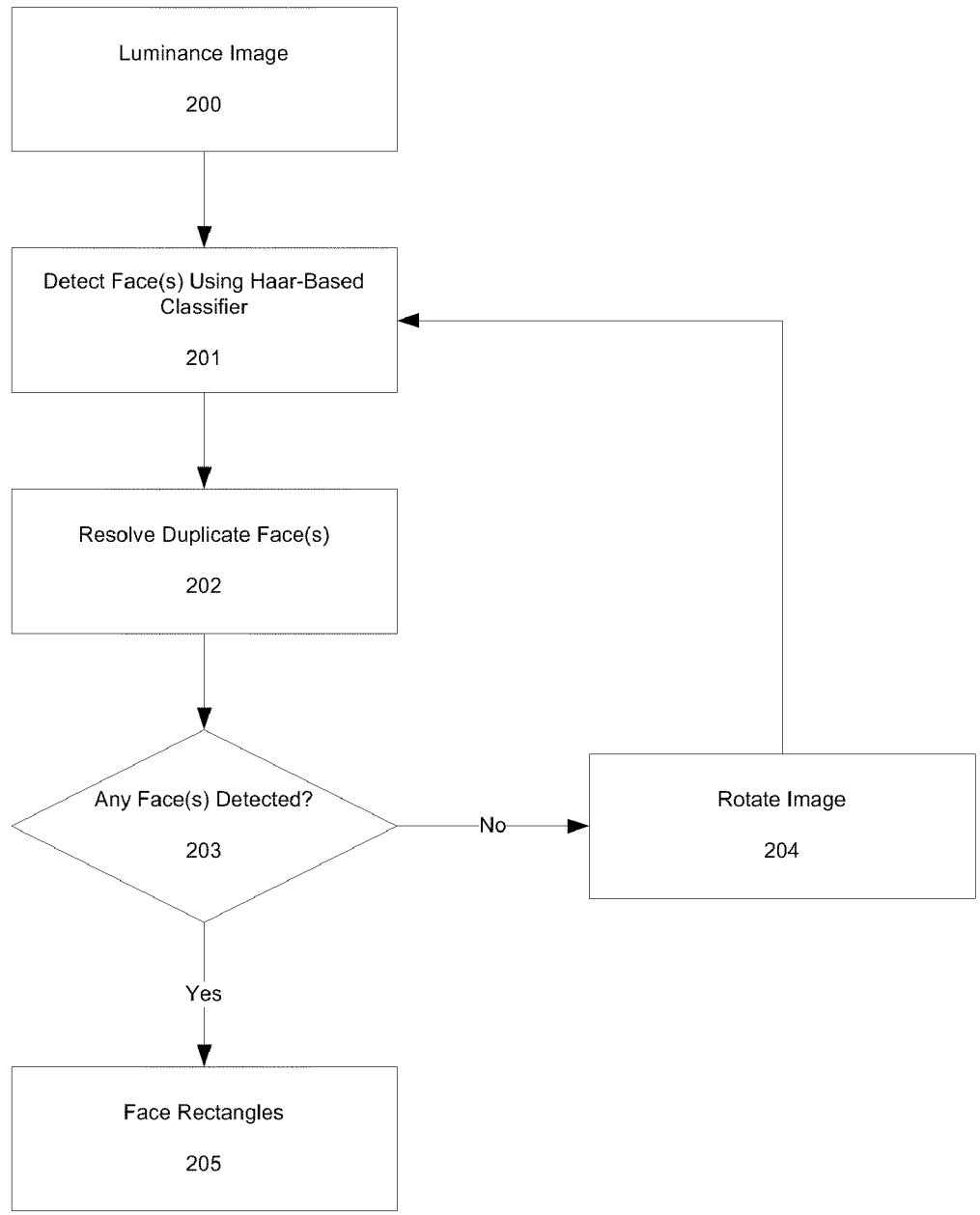
FIG. 2 is a diagrammatic illustration of an exemplary face detection scheme, according to one embodiment of the present invention.

FIG. 2 is a diagrammatic illustration of an exemplary face detection scheme 102. A luminance image is input 200 to detect a face or faces using a Haar-based classifier 201. Haar-based face detectors will find multiple hits for the same face since they detect faces at multiple scales and translations. This is an advantageous aspect of an embodiment of the present invention for it allows for gaining confidence about the detected face. A detected face passes only when there are at least two hits. The following rules are used to consolidate multiple hits: (1) If the faces are close enough, then merge them; (2) If one face rectangle is completely inside the other, then they are merged as well. By this, the detection method resolves duplicate faces 202.

Face detection is geared towards finding faces that are not tilted. If face detection fails for 0 tilt 203, the image is rotated in increments (e.g., increments of 5 degrees), starting from, for example, 15 degrees until a face is detected 204. Both clockwise and counterclockwise rotations are used for a given angle. This conservative approach keeps false alarm low. Once complete, face rectangles 205 can be created for the image used for 200.

Figure 3:
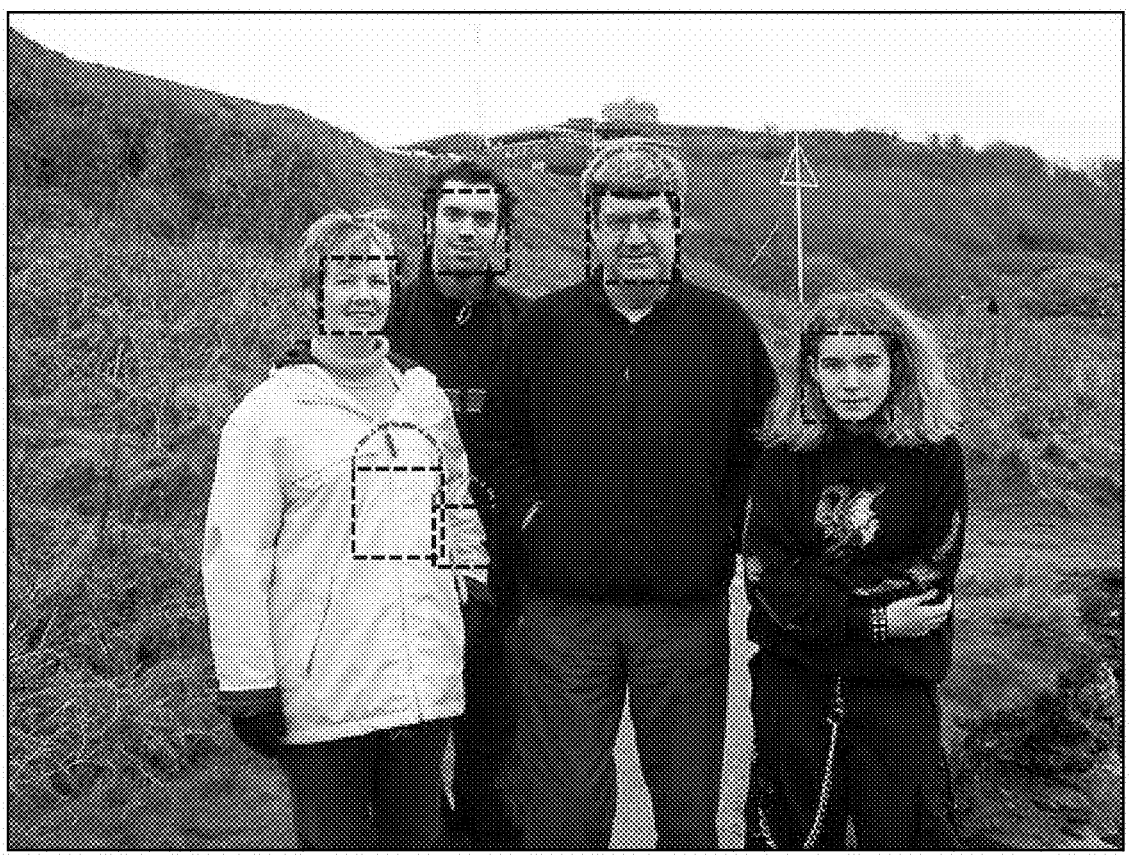
FIG. 3 provides an example of a possible result from the face detection scheme of FIG. 2.

FIG. 3 is provided as an example of a possible result from the face detection scheme 102. Faces are shown as rectangles with dashed lines. Notice that all faces are detected. However, there are two false alarms on the jacket of the women to the left of the image.

The face detector was tuned to have low miss rate at the cost of more false alarm. It returns a rectangle for each face it detects. Skin cue is used to reduce false alarm. Using skin cue for reducing false alarm is not unique. An example can be found in "Detection and tracking of humans by probabilistic body part assembly", A. S. Micilotta, E. J. Ong, R. Bowden, Proceedings of British Machine Vision Conference, vol. 1, pp. 429-438, September 2005, which is hereby incorporated by reference herein. The present invention uses skin cue differently from this example, where the authors (A. S. Micilotta, E. J. Ong, R. Bowden) look at the median color of face and use a Gaussian skin model for median color, to decide whether to keep or reject a face. Another popular approach to reduce false alarm is to use average face templates. The present invention does not use this approach since it would require several templates and it is computationally more expensive. Few other possibilities to reduce false alarm include extraction of eye map or mouth map or both to see if they are contained in face rectangles. Independent face detectors can be used and treated as a mixture of experts as well.

The present invention is geared towards computational efficiency and effectiveness, an advantageous aspect of the present invention Skin map and simple first order variation of luminance regardless of spatial correspondence is utilized. Refinement of faces is achieved through stages.

Figure 4:
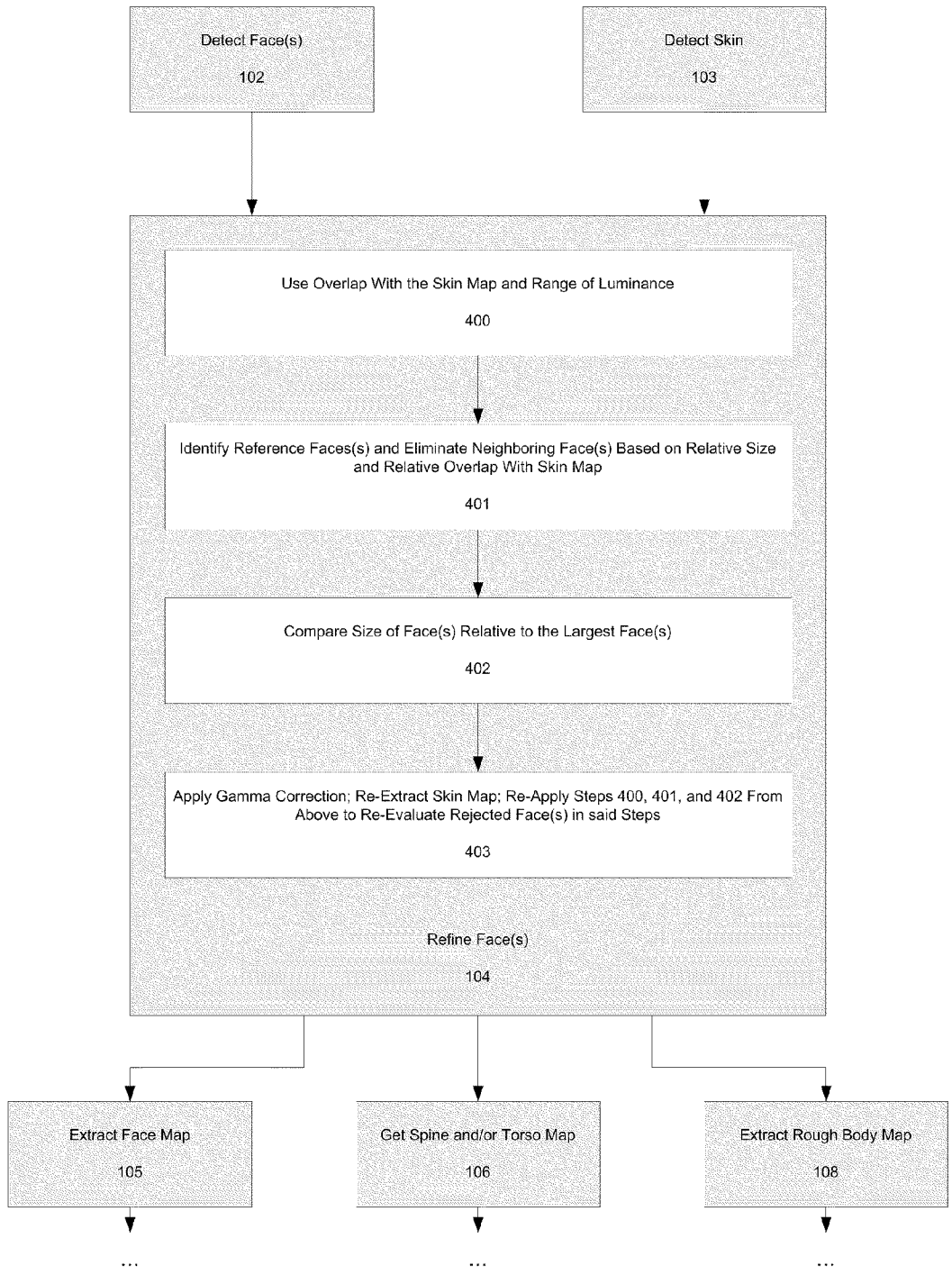
FIG. 4 is a diagrammatic illustration of an exemplary face refinement, according to one embodiment of the present invention.

Once face detection 102 and skin detection are processed, the illustrative example in FIG. 1 would then refine the face or faces 104 location. FIG. 4 is a diagrammatic illustration of an exemplary face refinement 104. It provides for steps that are taken in one embodiment of face refinement. In use overlap with the skin map and range of luminance 400, the rules used in this step are based on the following premises: (1) Unlike limbs and torso, faces are normally exposed. Thus, we can expect to see several skin pixels in the face region; (2) the present invention utilizes person or people segmentation geared towards frontal view of humans. For instance, all human faces have eyes in the front that are more likely to look darker than the other neighboring regions due to depression and curvature that reduces the amount of light that reaches the camera. Even non-reflective sunglasses are likely to be dark regions. This means that the difference between maximum and minimum luminance inside the face rectangle should be appreciable when compared to the average luminance.

A face rectangle is considered to be a false alarm if both of the following conditions are satisfied: (1) Percentage of skin pixels $\leq \gamma\%$, and (2) Range of luminance $\leq 50\%$ of mean of luminance. In some embodiment $\gamma=4\%$, when there is only one detected face. In some embodiments, when there are multiple detected faces, the maximum overlap of a face rectangle with the skin map is determined and $\gamma$ is 60% of this maximum. Of course, other values for $\gamma$ can be used and all such values are within the scope of the present invention.

In the identify reference face(s) and eliminate neighboring face(s) routine based on relative size and relative overlap with skin map 401, the following premises are relied upon: (1) Faces with high overlap with skin map are more likely to have well-behaved imaging conditions (incidence, diffusion and reflection); (2) Neighboring faces are more likely to have similar lighting conditions than faces that are far apart; (3) Neighboring faces with similar overlap with skin pixels are more likely to have matching skin properties; (4) Neighboring faces of similar size are more likely to be at the same distance plane from the camera lens. If there are clusters of faces, it is advantageous to find faces in the vicinity of the same distance plane.

The following steps are utilized in routine 401: (1) Faces that passed 400 and with more than a threshold amount of overlap (e.g., 50%) with skin map are selected as reference faces. These are treated as high confidence faces. (2) Neighbors are currently defined to be faces rectangles within 1 face width of the reference face under consideration, in the horizontal direction. A reference face is selected and its neighbors are found. (3) If the skin overlap of the neighbor is less than a threshold amount (e.g., half) of the skin overlap of the reference face and they differ in their widths by more than a threshold amount (e.g. 10%), then reject that neighboring face. (4) This process is repeated or performed contemporaneously for all other reference faces.

In the compare size of face(s) relative to the largest face step 402, face(s) that reaches this stage can still have a large range in size. If the range is too big, it is assumed there exists an error. Compare size of face(s) relative to the largest face routine 402 is utilized to identify or correct this error. The premise used is that the smallest face can be roughly up to a third of the size of the largest face. The maximum size of the passed faces is determined and any face that is less than a threshold amount of this size (e.g., 30%) is rejected.

In apply gamma correction; re-extract skin map; re-apply steps 400, 401, and 402 from above to re-evaluate rejected faces in said steps (403), detection rate is improved by reducing the miss rate instead of reducing false alarm. The following steps are utilized: (1) preprocess original image using gamma correction; (2) redetect skin pixels from the transformed image; (3) reapply stages 1-3 of face refinement using the new skin map; and (4) consolidate the detected faces before and after preprocessing.

In this embodiment, step 403 is only used if any of the rejected face(s) from steps 400, 401, or 402 overlap with any of the accepted faces. This provides for an advantageous aspect of the present invention, which is the reduction of false alarm that can be introduced after gamma correction.

It should be noted that 400 and 401 rely significantly on the skin map detected in step 103 from the original image. There is a possibility that the lighting conditions in the original image shifted the color of skin out of range of the skin models. This could be fixed by preprocessing the image before getting the skin map.

For the special case where the colors in an image are a bit washed out, it is observed that the blue content is increased. To compensate for this, the blue content of the image is reduced. This is equivalent to increasing yellow content of the image. Attenuating blue channel alone may have an unpleasant effect on colors in the image. To balance this, both red and green are emphasized by an equal amount. This is achieved by application of the standard gamma correction to red, green and blue channels with $\gamma_{red}=\gamma_{green}=0.9$ and $\gamma_{blue}=2$. Note that a color is emphasized when $\gamma<1$ and attenuated when $\gamma>1$.

Figure 6:
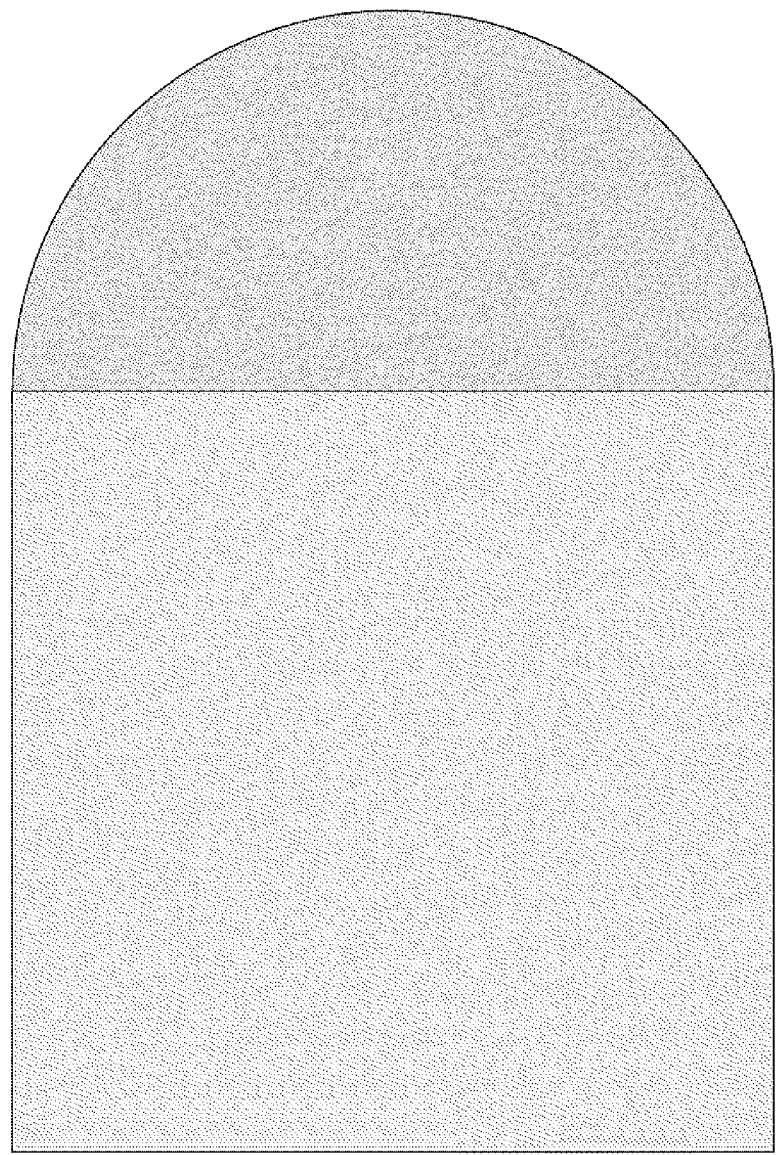
FIG. 6 is an illustrative example of a template for rough face map used by an extract face map method, according to one embodiment of the present invention.

In the extract face map step 105, the present invention takes advantage of "JigCut clean up" approach proposed in U.S. Provisional Patent Application No. 61/007,359, entitled "Systems and methods for unsupervised local boundary or region refinement of figure mask using over and under segmentation of regions", filed Dec. 11, 2007, which is hereby incorporated by reference in its entirety. This approach only requires a rough mask for which JigCut clean up is applied. A simple and reasonable mask for each face is the face rectangle with a semi-circular disc on top of it. This is illustrated in FIG. 6. FIG. 6. is an illustrative example of a template for a rough face map used by 105. A semicircular disc is placed on top face rectangle. The diameter of disc equals the width of the rectangle. The semicircular disc is used to approximate the top of head so that we can get hair as part of the segmentation as well. The width of face is used as the diameter of the disc. This rough binary mask seems to work for most cases. A more accurate, but cumbersome method is to look for boundary of head using parametric curves.

This is repeated for each face rectangle and the union of these masks is treated as a rough binary mask for all faces in the image. JigCut cleanup is applied on the union of these masks. The final head segmentation is the union of JigCut regions that have at least a threshold (e.g., 50%) overlap with this mask. This approach gives a reasonable estimate of faces. Any discrepancy will be dealt with in the refine person/people map step 110. Note that the present invention is robust to different views of face (tilt, yaw, profile), but simple, elegant and effective. Using templates for parts of the face or the entire face is common in the literature. They are often cumbersome requiring several templates and are not robust enough to different views of the face.

Figure 5:
FIG. 5 is provided as an illustrative example of an image processing till that shows transformation of colors by gamma correction improves skin detection, which in turn improves refinement of faces: 5($a$) is a original image; 5($b$) is the gamma corrected image; 5($c$) is the original skin detection; 5($d$) is the result of skin detection after gamma correction; and 5($e$) is the final list of faces after refinement.
Figure 5:
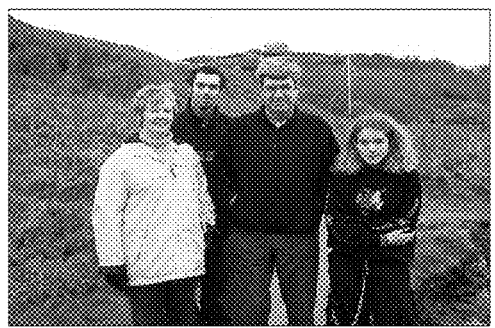
Figure 5:
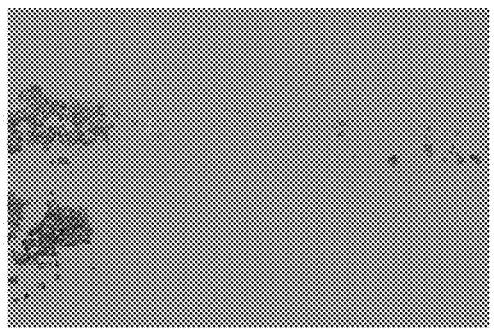
Figure 5:
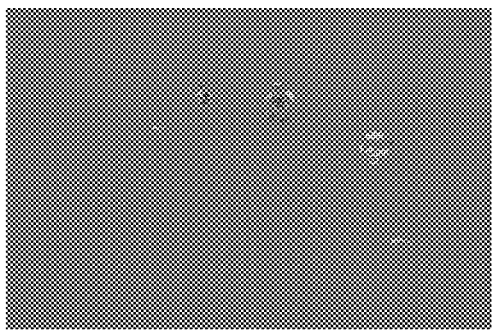
Figure 5:

FIG. 5 is provided as an illustrative example of an image processing till 104. This example shows transformation of colors by gamma correction improves skin detection, which in turn improves refinement of faces by the refine face(s) step 104. In FIG. 5, 5(a) is the original image and FIG. 5(b) is the gamma corrected image. Note that grey-scale patterns are more natural in 5(b) than in FIG. 5(a). This allows better detection of skin. FIG. 5(c) is the original skin detection from detect skin 103. FIG. 5(d) is the result of skin detection after gamma correction. FIG. 5(e) is the final list of faces after refinement 104. False alarms were rejected and all four faces are retained. When the original skin map was used, only the left most face was kept.

Figure 7:
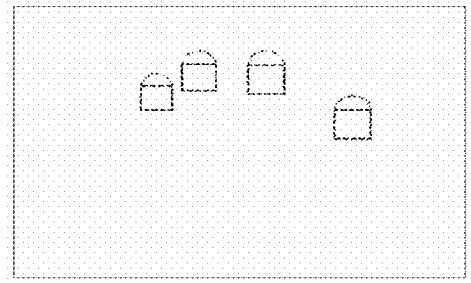
FIG. 7 is an illustrative example of an image processing till 105: 7($a$) shows the face rectangle and semi-circular disc on the faces that were detected; 7($b$) is a binary mask corresponding to 7($a$); 7($c$) provides the corresponding regions from 7($b$); 7($d$) provides the final binary face map after JigCut clean up; and 7($e$) is the corresponding regions from 7($d$).
Figure 7:
Figure 7:
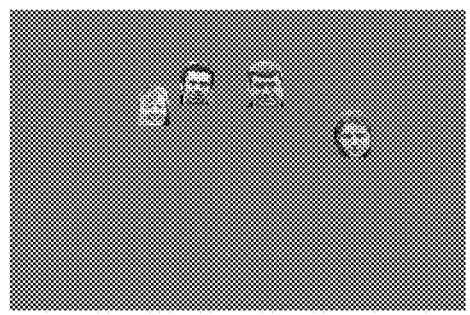
Figure 7:
Figure 7:

FIG. 7 is provided as an illustrative example of an image processing till 105. The different stages involved are illustrated. FIG. 7(a) shows the face rectangle and semi-circular disc on the faces that were detected. FIG. 7(b) is a binary mask corresponding to FIG. 7(a). FIG. 7(c) provides the corresponding regions from FIG. 7(b) in grey-scale. FIG. 7(d) provides the final binary face map after JigCut clean up. FIG. 7(e) is the corresponding regions from FIG. 7(d) in grey-scale.

Figure 8:
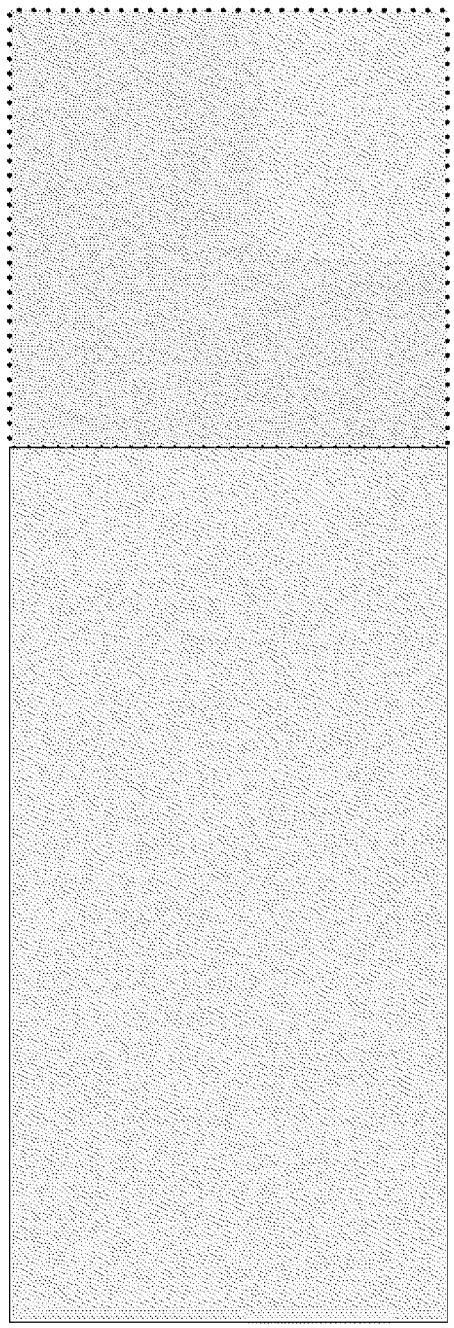
FIG. 8 is an illustrative example of a conservative template for the spinal area of torso used by a get spine and/or torso map procedure in accordance with an embodiment of the present invention.

In get spine and/or torso map step 106, it is considered that human limbs have more complex configurations than rigid parts like head and torso. The present invention assumes that people in the image are oriented vertically. This means that the torso must be immediately below the head, except for the possibility of a long neck. The size of shoulder relative to face depends on the growth of human. For example, shoulders are narrower in a child than a fully grown adult, relative to the size of their face. In other words, the width of torso depends on the person. The same applies to the height of torso. However, spine and regions near spine are roughly similar. A reasonable estimate of this rigid region (spinal area of torso) across all people is a rectangle of same width as the width of face rectangle and height which is twice the height of face rectangle. An illustration is included in FIG. 8. FIG. 8 is an illustrative example of a conservative template for the spinal area of torso used by step 106. This is a rectangle immediately below the face rectangle. Width of the template is equal to the width of face rectangle, while the height equals twice that of the face rectangle. The face rectangle (shown in dotted lines) is not part of this template.

This is repeated for each face rectangle and the union of these masks is treated as a rough binary mask for all spinal torso regions in the image. The union of spinal regions is referred to as the template for spine/torso map or spine map.

JigCut cleanup is applied to the rough spine map. The final segmentation of spinal torso region is the union of JigCut regions that have at least 5% overlap, at least 10% overlap, or at least 20% overlap with the spine map template. Any other JigCut region with lower, but positive overlap is included if it is spatially adjacent to a JigCut region in the initial spine map and also close enough to it in the RGB color space. A small threshold of 5%, 10%, 15%, or some value between 3% and 25% is used since the torso region is rigid and the template is an under-estimate of the torso. The use of a low threshold and a limited region grow using RGB color space helps in masking more of the torso than just the spinal region.

It is possible that the spinal map includes regions that are considered poor body configurations. To eliminate such regions, the following rules can be utilized: (1) If any of the JigCut regions from spine map touch the top edge of image frame, then eliminate them from the spine map; (2) JigCut regions from spine map that are too far (about 4.5 times the width of face) to the left or right of the face rectangle are eliminated; (3) Bigger JigCut regions from spine map that are almost horizontal and too far (about 4.5 times the width of face) to the left or right of the face rectangle are eliminated. JigCut regions are approximated by ellipses. If, for example, the minor axis of ellipse is greater than 75% of height of the largest face, then the JigCut region is considered big. In some embodiments, aspect ratio is used as a confidence for orientation and the threshold for orientation is 30° or some value within 10° of 30°.

Figure 9:
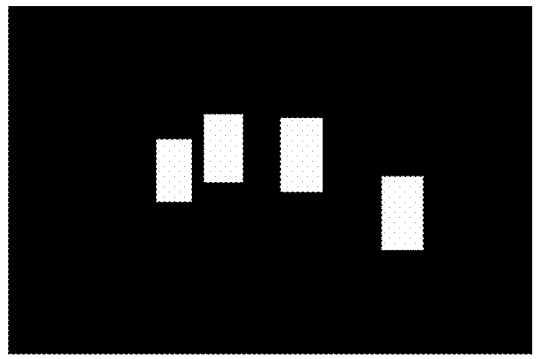
FIG. 9 is an illustrative example for the estimate of the creation of a spine/torso map based on the original image 5($a$) in FIG. 5$j$: 9($a$) is the binary mask corresponding to the weak template for spinal regions of torso; 9($b$) is the corresponding regions from 9(a); 9(c) is the final spine/torso map after JigCut clean up; and 9(d) is the corresponding regions from 9(c).
Figure 9:
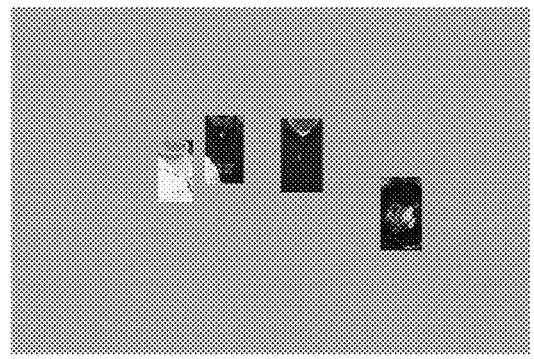
Figure 9:
Figure 9:
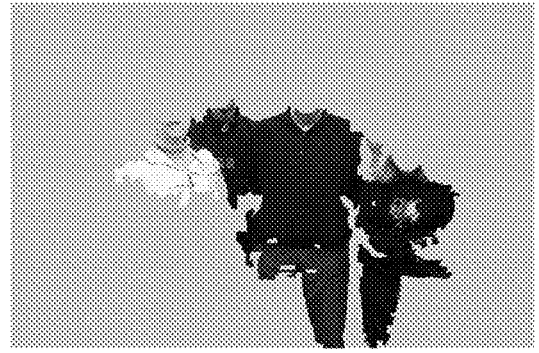

This approach gives a reasonable estimate of spine/torso map. FIG. 9 is provided as an illustrative example for the results from step 106 of FIG. 1. Based on the original image 5(a) in FIG. 5, FIG. 9(a) is the binary mask corresponding to the weak template for spinal regions of torso. FIG. 9(b) is the corresponding regions from 9(a) in grey-scale. FIG. 9(c) is the final spine/torso map after JigCut clean up. FIG. 9(d) is the corresponding regions from FIG. 9(c) in grey scale.

Note that the torso region is usually complex for a clothed person due to the complex design of clothing, changes in luminance/saturation of colors due to folds in clothing, occlusion due to arms or other objects. The present invention avoids the complex correlation based approach and is simple and elegant. This also addresses clothing that does not have uniform patterns throughout.

Then, referring to FIG. 1, at this stage in an embodiment in accordance with the present invention step 107 is performed. Step 107 is a skin map refinement. Pixel-based skin detection methods are prone to noise since they do not use high level cues from the current image. The skin detection in an embodiment of the present invention is pixel-based. Face detection is used to give a top-down cue to refine skin pixels.

Figure 10:
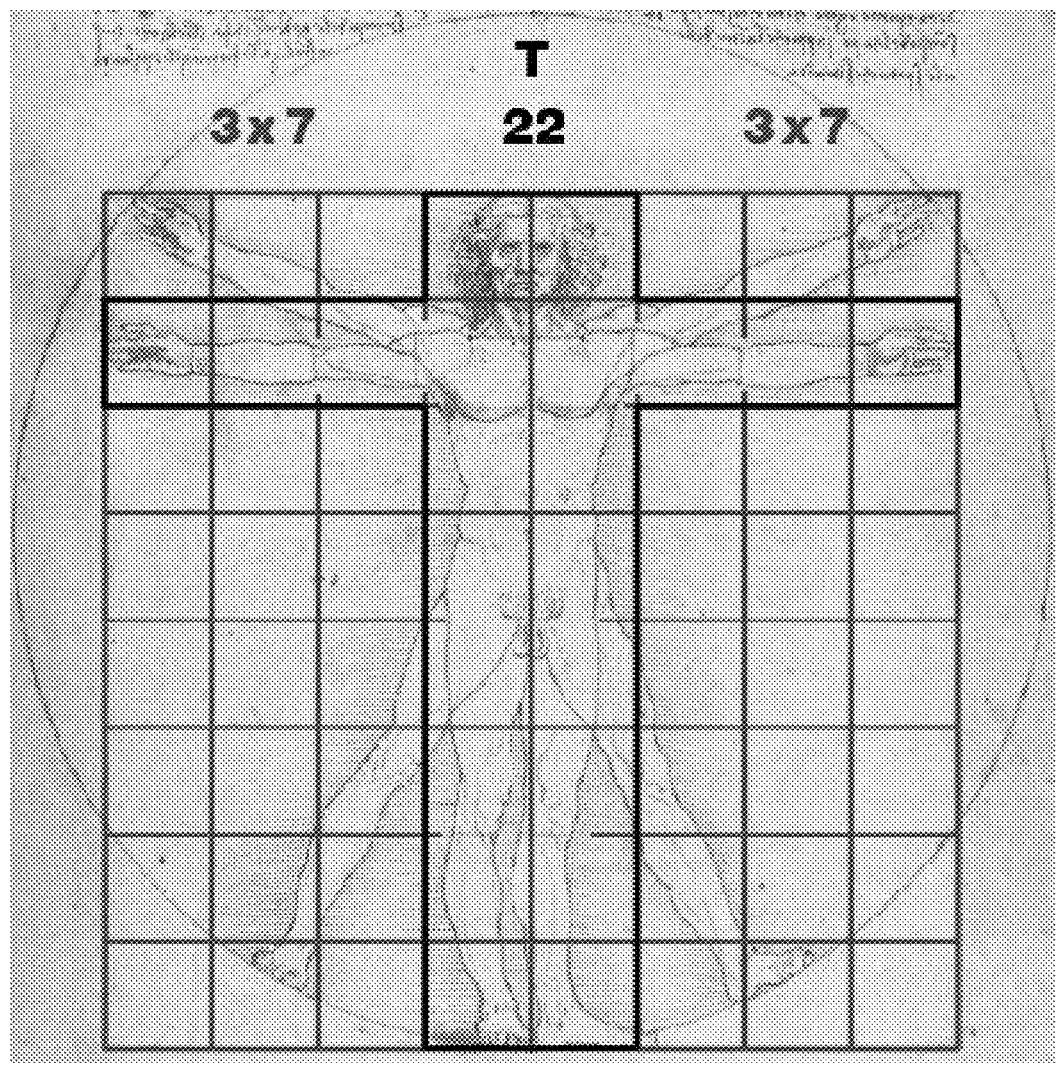
FIG. 10 illustrates proportions of body parts for the "perfect human" using Leonardo da Vinci's art work.

Proportions of body parts for the "perfect human" were suggested by several people. The model by Vitruvius ("De Architectura", Vitruvius, Book 3, c. I(1), $1^{st}$ century BC) became popular due to Leonardo da Vinci's work as in FIG. 10. Vitruvius represented body parts proportional to the dimensions of the face. Other representative models can be found in "Quantifying and recognizing human movement patterns from monocular video images—Part II: Applications to biometrics", R. D. Green, L. Guan, IEEE Transactions on Circuits and Systems from Video Technology, vol. 14, issue 2, pp. 191-198, February 2004, which is hereby incorporated by reference herein, where the authors use this idea to extract features for biometrics. The Vitruvian model was used by "Detection and tracking of humans by probabilistic body part assembly", A. S. Micilotta, E. J. Ong, R. Bowden, Proceedings of British Machine Vision Conference, vol. 1, pp. 429-438, September 2005, which is hereby incorporated by reference herein, along with other cues for detection and tracking of humans in videos.

Figure 11:
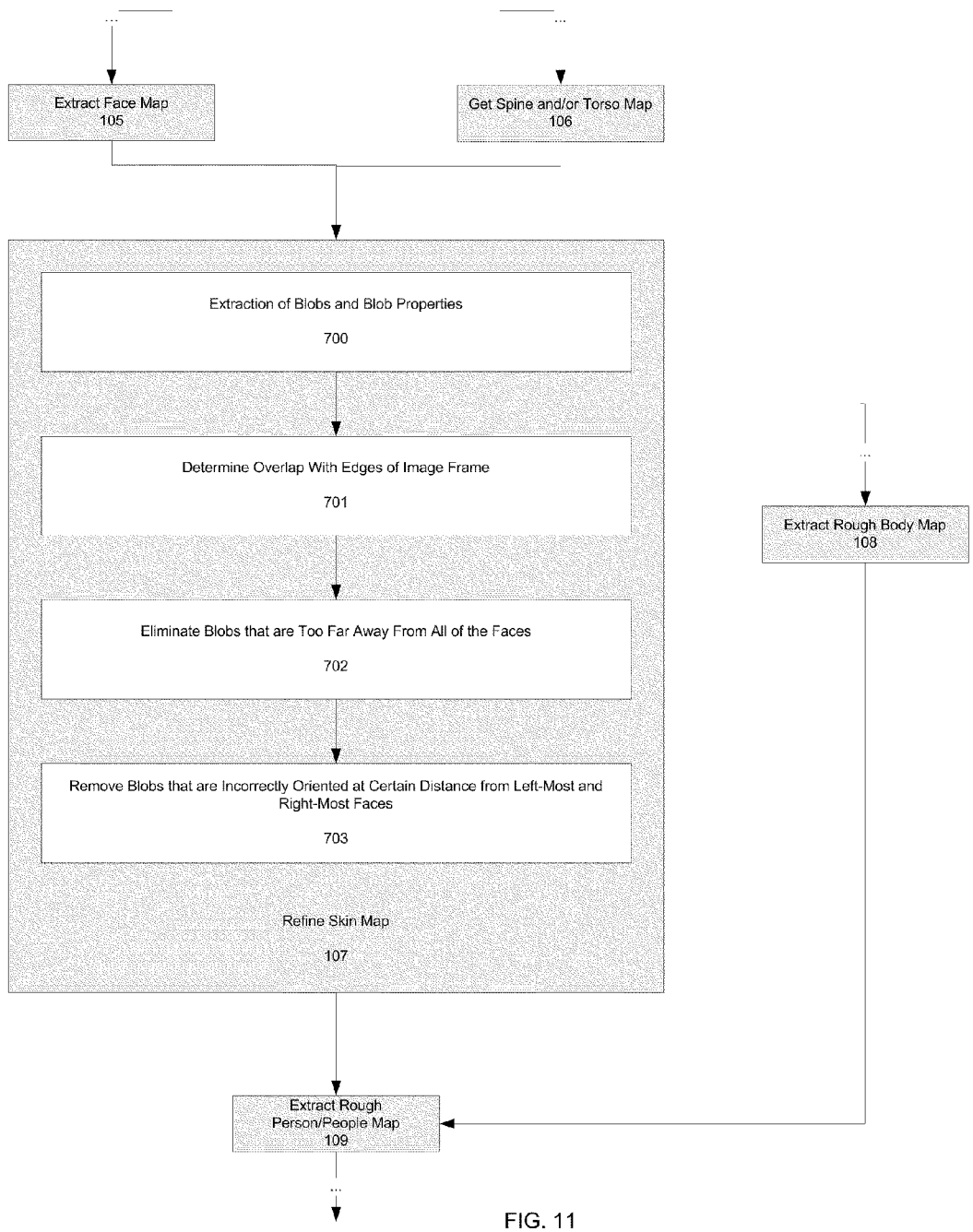
FIG. 11 is a diagrammatic illustration of a refine the skin map algorithm in accordance with an embodiment of the present invention.

Sin step 107, skin pixels are first refined using JigCut cleanup. The refined mask is the union of JigCut regions that have at least, for example, 50% overlap with the initial skin mask. In various alternative embodiments, the requirement of at least 30%, at least 40%, at least 60%, or at least 70% overlap with the initial skin mask is used. A set of rules based on a model similar to the Vitruvian-Man is then used to remove noisy skin blobs. This is achieved through several stages, grouped based on type of rules, as summarized in FIG. 11. FIG. 11 is a diagrammatic illustration of step 107 of FIG. 1. A skin blob that satisfies any of the rules is eliminated. The only exception is when a skin blob overlaps with the union of face and spine/torso maps by more than 50%.

Generally speaking, the following convention is observed for the rules used for step 107, unless specified otherwise: (1) a blob is considered large when its area is >2*largest area of all faces; (2) a blob is considered far if it greater than half the maximum dimension of all faces; (3) the uncertainty in orientation is +/−10° and aspect ratio is used to measure confidence of orientation.

In step 700 of FIG. 11, connected component analysis is applied to the skin map after JigCut clean up with an overlap threshold. In preferred embodiments the overlap threshold is 50%. In various alternative embodiments the overlap threshold is set to a single value anywhere in the range between 25% and 75%. In various other embodiments the overlap threshold is set to a single value anywhere in the range between 40% and 70%. Area and rectangular bounding box of each blob is determined. The best-fit ellipse is determined for each blob. The minor axis, major axis and orientation of each ellipse are recorded. The rules are applied based on these properties.

In step 701 of FIG. 11, the premise that most of the consumer images do not have people touching either the left, top or right edges of image frame is utilized. This observation is used to eliminate skin blobs that touch any of these edges by a certain amount. The exact rules are as follows. A skin blob that satisfies any of the following rules is eliminated:

(1) Contact with top edge as well as one of the side edges of image frame;

(2) Overlap with top edge of image frame>a threshold percentage of width of image (e.g. 30%, or some single value chosen from the range of between 5% and 70% of width of image);

(3) Overlap with left edge of image frame>(height of image−a threshold of height of the left-most face) (e.g., 150%, or some single value chosen from the range of between 125% and 175% of height of the left-most face);

(4) Overlap with right edge of image frame>(height of image−a threshold of height of the right-most face) (e.g., 150%, or some single value chosen from the range of between 125% and 175% of height of the right-most face).

Figure 12:
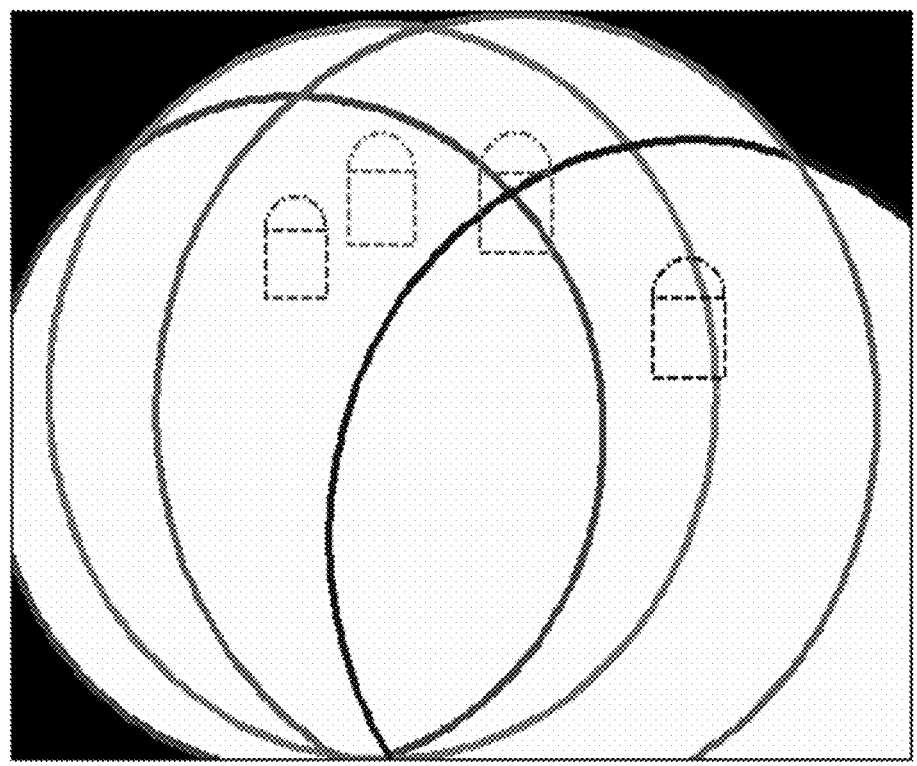
FIG. 12 displays the union of "Vitruvian" discs, in accordance with an embodiment of the present invention.

In step 702 of FIG. 11, an attempt is made to retrieve skin regions that correspond to people nearby only when their face is detected. A skin blob that satisfies any of the following six rules is eliminated:

(1) A mask is created using the union of "Vitruvian disc" for each face as shown in FIG. 12. These discs are identical to the model in FIG. 10. FIG. 12 displays the union of "Vitruvian" discs. Four faces were detected in the original image and are shown using rectangles. Color of face rectangles and Vitruvian discs match and are shown for pedagogic reasons. The mask itself is binary. In some embodiments, if the overlap of skin blob with this disc is ≦50% and either the area is greater than half the area of face or the minor axis is greater than half the maximum height of all faces, then that blob is removed. In various alternative embodiments, if the overlap of skin blob with this disc is ≦30%, ≦35%, ≦45%, ≦55%, or ≦60% and either the area is greater than a first threshold of the area of face or the minor axis is greater than a second threshold of the maximum height of all faces, then that blob is removed. In these various alternative embodiments, the first threshold is a single value chosen from the range of 0.25 to 0.75 and the second threshold is a single value chosen from the range of 0.25 to 0.75.

(2) Large and too far above all other candidate faces (top row of blob starts more than maximum face height from the top-most face).

(3) Too far (e.g., about 8 times maximum height of faces) below all other candidate faces (in various other embodiments a criterion of 9 times maximum height of faces, 10 times maximum height of faces, 11 times maximum height of faces, or a single value in the range of between 5 and 15 times maximum height of faces, is used for this selection rule.

(4) Too far to the left of all other candidate faces (e.g., starts at >4.5*width of left-most face). For large blobs, a lower threshold (e.g., 1.5 instead of 4.5) is used.

(5) Too far to the right of all other faces (e.g., right side of blob is >4.5*width of right-most face). For large blobs, a lower threshold (1.5 instead of 4.5) is used.

(6) Thin blobs (e.g., minor axis<half the maximum face height, major axis>4*minor axis) are removed if they are too far above all faces.

In step 703 of FIG. 11, the premise that is used to remove blobs is that limbs are thin and the torso is much bigger. Also, human limbs are connected to axes of rotation and hence their orientations are limited depending on their extension. Thus, the following rules are used in step 703 to remove blobs in some embodiments:

(1) Horizontal blob too far away below the abdomen (e.g., >2.5*face height from the bottom-most face);

(2) Horizontal blob too far (more than maximum face width away) above all faces;

(3) Vertical blob too far away the left (left column>width of left-most face); and (4) Vertical blob too far away the right (right column>width of right-most face).

In some embodiments, if any one of these four rules is not satisfied, the blob is removed.

Figure 14:
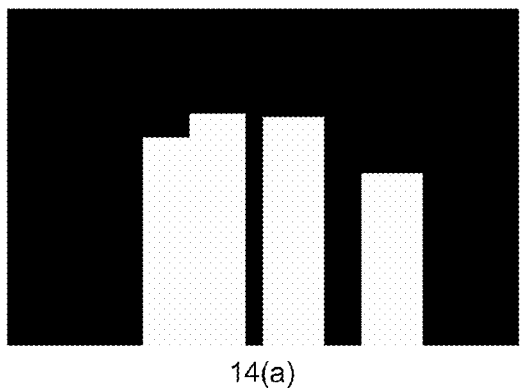
FIG. 14 illustrates the various steps of an extract rough body map algorithm using the sample image 5(a): 14(a) represents the binary mask corresponding to the weak template for body map; 14(b) displays the corresponding regions from 14(a) in color; 14(c) displays the final body map after JigCut clean up as a binary mask; and 14(d) displays the corresponding regions in color.
Figure 14:
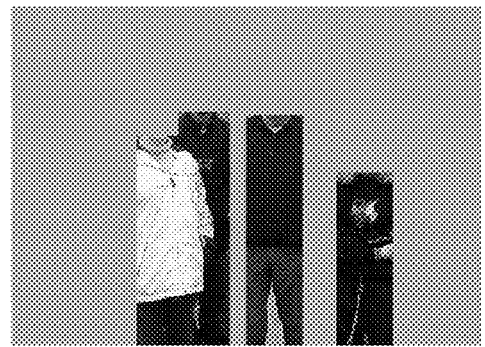
Figure 14:
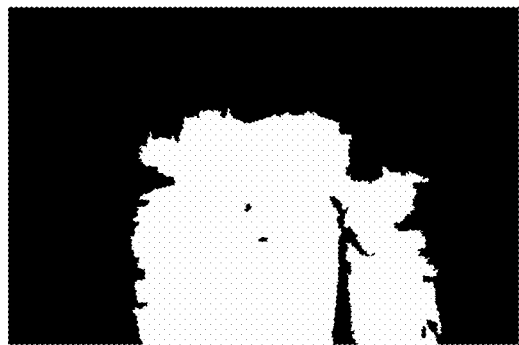
Figure 14:
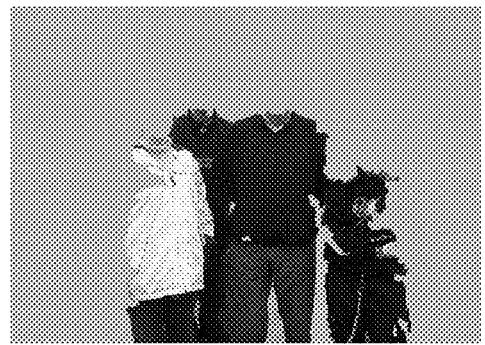

Referring to FIG. 1, the inventive method further includes step 108 in which a rough body map is extracted. In step 108, a rectangular mask is created below each face e.g. with 1.5 times the width and 9 times the height of the corresponding face. In alternative embodiments, the rectangular mask is created below each face e.g. with a single value in the range between 0.7 and 2 times the width and a single value between 6 and 12 times the height of the corresponding face. JigCut cleanup is applied to the union of these rectangles. In typical embodiments, the final body mask is the union of JigCut regions that have at least 50% overlap with this rough mask. In other embodiments, the final body mask is the union of JigCut regions that have at least 30%, at least 40%, or at least 60% overlap with this rough mask. The conservative estimate of 1.5 times the width was chosen since kids have this size relative to their face. The height was chosen to be 9 times the height of face as an over-estimate since the background behind/near the lower body is normally less complex than background behind/near the upper body and hence easier to be removed using JigCut cleanup. Any other extraneous regions will likely be cleaned up by the last module, which refines the people mask. FIG. 14 illustrates the various steps using the sample image 5(a). FIG. 14(a) represents the binary mask corresponding to the weak template for body map. 14(b) displays the corresponding regions from 14(a) in greyscale. FIG. 14(c) displays the final body map after JigCut clean up as a binary mask and FIG. 14(d) displays the corresponding regions in grey-scale.

A less conservative width (which equals twice the width of face rectangle) is used for portrait images, where the human shoulder and upper chest covers most of the bottom edge of image frame. An image is considered a portrait when there is only one detected face whose width is greater than a fourth of image width.

Figure 13:
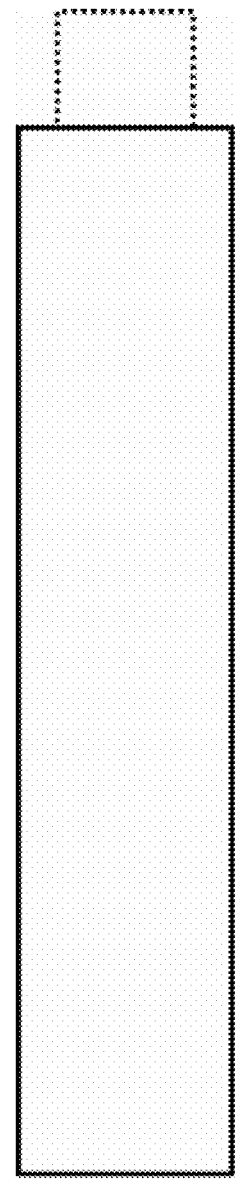
FIG. 13 is an illustrative example of a conservative template for a body map used by an extract rough body map algorithm, in accordance with an embodiment of the present invention.

FIG. 13 is an illustrative example of a conservative template for body map used in step 108 of FIG. 1. This is a rectangle immediately below the face rectangle. In some preferred embodiments, the width is equal to 1.5 or 2 times the width of face rectangle, while the height is equal to nine times the height of the face rectangle. In some embodiments, the width is equal to a single value between 1.3 and 2.5 times the width of face rectangle, while the height is equal to a single value between five time and twelve times the height of the face rectangle. The face rectangle (shown in dotted lines) is not part of this template. In some embodiments, twice the width is used for portraits. This template is conservative for width and liberal for height.

Figure 15:
FIG. 15 illustrates the rough person mask for the example used in FIG. 5(a).

Referring to FIG. 1, the method continues in step 109 in which a rough person/people map is extracted. The rough person/people map 109 is obtained by the union of skin, face, spine/torso and body maps. This essentially effectuates putting different pieces of the body together in order to get a rough estimate of the entire body, thus far. FIG. 15 shows the rough person mask for the example used in 5(a).

Figure 16:
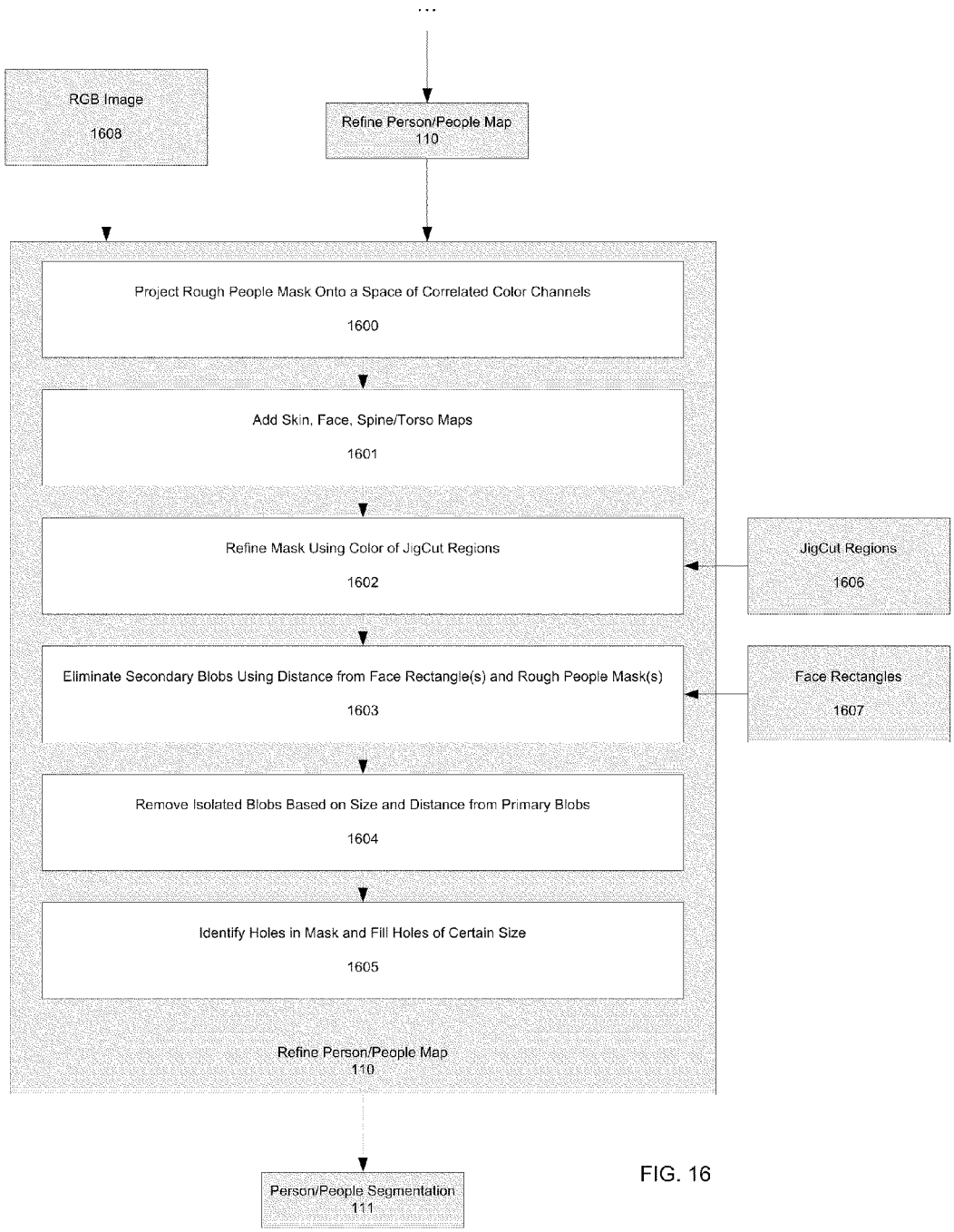
FIG. 16 is a diagrammatic illustration of an exemplary refinement of the rough person/people map step.

The present embodiment would then refine the rough person/people map 110. The rough people mask may have body parts missing and include portions of background. The refinement scheme performed by 110 attempts to tackle this problem through a series of steps. FIG. 16 is a diagrammatic illustration of an exemplary refinement of the rough person/people map 110.

In project rough people mask onto a space of correlated color channels 1600, RGB color channels are decomposed into a set of fuzzy color membership channels. The present embodiment utilizes 12 fixed color prototypes and assigns membership to each prototype using fuzzy membership rules. These color prototypes are red, green, blue, yellow, orange, purple, brown, pink, light blue, white, black and grey. This is treated as a 12-dimensional color space. The mask is assumed to be represented as a linear combination of membership values (i.e.) linear combination of feature vectors, where each vector corresponds to a pixel in the 12-dimensional prototypical color space. Geometrically, the mask is represented by a slice through the 12-dimensional space, where the pixels are either on or in the vicinity of this slice/hyper-plane. There may be some outliers as well. The goal is to find this plane. Mathematically, the slice is represented by a collection of points that are weighted sum of features. The goal boils down to determination of these weights. These weights can be estimated using the classical Least-Squares approach. The Least-Square approach has the geometrical interpretation of projection of the set of points onto a plane in the given space. The details of this algorithm are as follows:

Let n=# color channels, m=# pixels, i=channel index, j=pixel index, $x_{ij}$=pixels from channel i, $y_j$=pixels from mask.

We want each pixel j to satisfy:

$$\sum_{i=1}^{n} w_i x_{ij} = y_j,$$

which can be rewritten as:

$$\sum_{i=1}^{n} w_i \underline{x}_i = \underline{y},$$

where $\underline{x}_i = [x_{i1}, x_{i2}, \ldots x_{im}]$, $\Rightarrow A\underline{w} = \underline{y}$, where $A = [\underline{x}_1, \underline{x}_2, \ldots, \underline{x}_n]$ $\Rightarrow \underline{w}_{LS} = (A^T A)^{-1} A^T \underline{y} = A^+ \underline{y}$, where $A^+ =$ Moore—Penrose inverse of $A$.

Applying this to both rough people mask and it's complement, $$\underline{w}_{people} = A^+ \underline{y}$$

$$\underline{w}_{notpeople} = A^+ (1-\underline{y}).$$

The projected masks can be obtained using these weights as follows:

$$\underline{y}_{people} = ]\sum_{i=1}^{n} (w_{people})_i \underline{x}_i [,$$

where $]\underline{x}[ = \underline{x}$ normalized to occupy full range [0,1]

$$\underline{y}_{notpeople} = ]\sum_{i=1}^{n} (w_{notpeople})_i \underline{x}_i [$$

These can be treated as 2 independent estimates and an equal mix is given by:

$$\underline{y}_{people}^{Mixture} = ]\underline{y}_{people} + (1 - \underline{y}_{notpeople})[$$

This mixture is then thresholded to get a binary people mask.

$$\underline{y}_{people}^{Final} = \underline{y}_{people}^{Mixture} > \min(0.5, Otsu(\underline{y}_{people}^{Mixture}))$$

where Otsu(~)=threshold based on Otsu's method ("A Thresholding Selection Method From Gray-Level Histogram", N. Otsu, IEEE Transactions on System, Man and Cybernetics, vol. 1, pp. 62-66, 1979"). The projected mask from the sample image 5(a) is displayed in FIG. 17.

Figure 17:
FIG. 17 illustrates the projected rough people mask from the sample image of FIG. 5(a) in which 17(a) is a binary representation while 17(b) is the corresponding grey-scaled representation.
Figure 17:

FIG. 17 is provided as an example of project rough people mask onto a space of correlated color channels 1600 for sample image 5(a). 17(a) is a binary representation while 17(b) is the corresponding representation in color.

Figure 18:
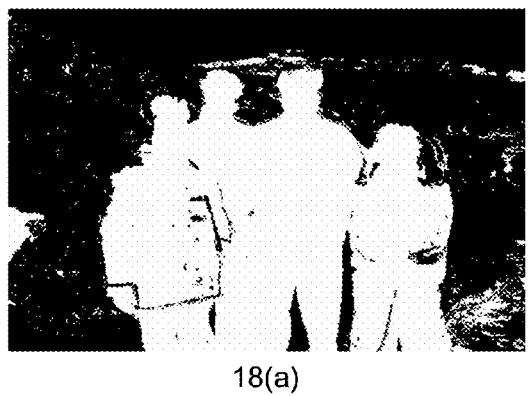
FIG. 18 is an example of an add skin, face, spine/torso maps routine for processing of sample image 5(a) in which 18(a) is a binary representation of the mask after inclusion and 18(b) is the corresponding representation in grey-scale.
Figure 18:
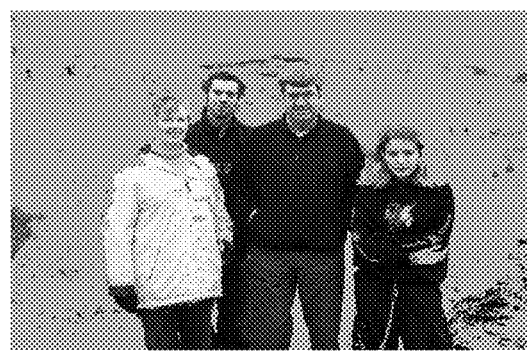

In add skin, face, spine/torso maps 1601, the premise is that when there are regions in the background with color similar to skin, such as wooden furniture or sand, it is possible to lose all skin colored pixels after projection. The same applies to torso regions. The present invention utilizes skin, face, spine/torso maps from previous steps. These are considered to be high confidence maps since they are more robust than maps for limbs which are harder to estimate for complex human configurations. FIG. 18 is provided as an example of add skin, face, spine/torso maps 1601 for processing of sample image 5(a). 18(a) is a binary representation of the mask after inclusion and 18(b) is the corresponding representation in color.

In refine mask using color of JigCut regions 1602, JigCut cleanup is applied to the mask from 1601 so that the mask is a union of JigCut regions. JigCut regions are selected only when they contain at least 50% of pixels from the mask. JigCut regions that were introduced by projection 1600 are examined. An added JigCut region is retained only if its color matches the color of one of the JigCut Regions common to the masks before and after projection. The following is a summarization in a mathematical representation of operations involved in clean up after projection:

M:=rough binary mask for people
P:=projection operator
A:=set of JigCut regions of M
B:=set of JigCut regions of P (M)
C:=A∩B
D:=B−A
$S(r_i, r_j) := 1$ iff JigCut regions $r_i$, $r_j$ have similar color, else it is 0.
X:={r ∈ B−A|∃t ∈ C,S(r,t)=1}
Y:=mask after clean up=X∪C Color similarity might prove to be difficult to deal with since if a JigCut region was introduced, it was partly because the color of that region is very close to the hyper-plane in the 12-dimensional space. Using RGB or CIE-Lab or HSL or any other color space in a standard way (Euclidean or Manhattan distance in 2-D or 3-D color space) should fail.

Figure 19:
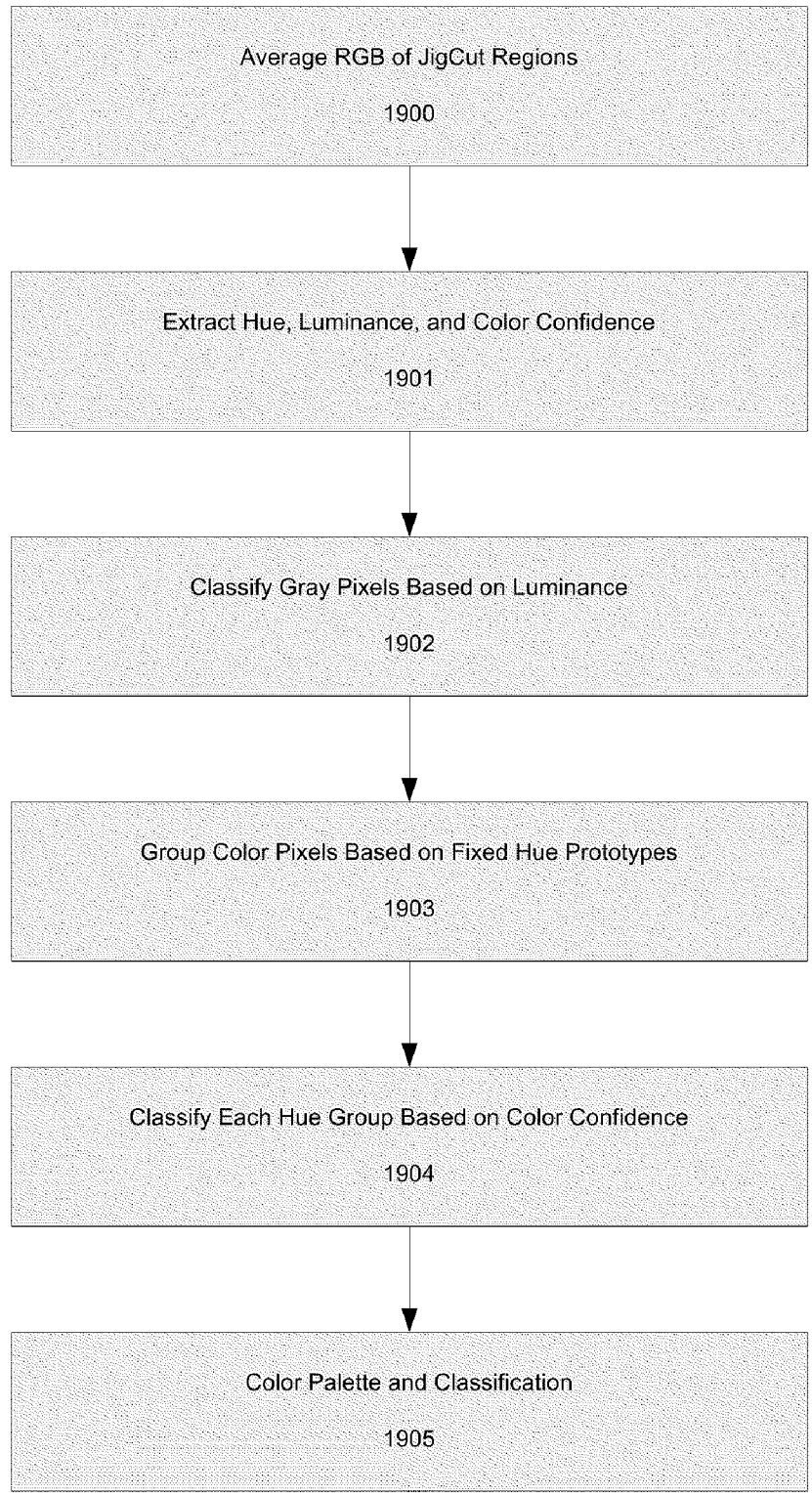
FIG. 19 is a diagrammatic illustration of a method for refining a mask using JigCut regions, in accordance with an embodiment of the present invention.
Figure 20:
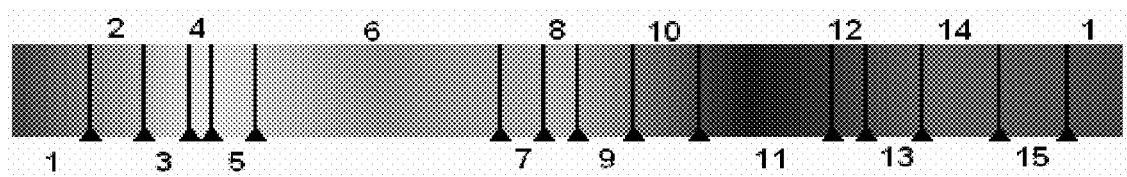
FIG. 20 is an illustration of color regions based on a hue wheel.

The present invention utilizes a hierarchical rule-based color quantizer to identify the colors in the color palette for the selected image. The color quantizer uses hue and luminance from the standard HSL space along with a color confidence map. Color quantization is applied to the average colors of JigCut regions. FIG. 19 is a diagrammatic illustration of one embodiment for refining the mask using JigCut regions. In this embodiment, the average RGB of JigCut regions 1900 is utilized to extract hue, luminance, and color confidence 1901. 1901 extract hue, luminance and assign color confidence based on distance from the line from (0,0,0) to (1,1,1) in RGB color space. Distance formula is normalized so that the maximum value is unity. Then in the present embodiment, gray pixels based on luminance are classified 1902. Classify low color confidence (or "gray") pixels based on luminance. There are 5 uniformly spaced luminance bins. Color confidence is assumed to be low when color confidence is 6%. Then the present embodiment groups color pixels based on fixed hue prototypes 1903. Colorful pixels are grouped based on hue as shown in the table below and in FIG. 20. FIG. 20 is provided as an illustration of the color regions based on the hue wheel.

| Hue Bin | Name | Hue Interval |
| --- | --- | --- |
| 1 | Red | [0, 0.0707) ∪ [0.9596, 1] |
| 2 | Orange | [0.0707, 0.1212) |
| 3 | Light Orange | [0.1212, 0.1616) |
| 4 | Yellow | [0.1616, 0.1818) |
| 5 | Yellowish Green | [0.1818, 0.2222) |
| 6 | Green | [0.2222, 0.4444) |
| 7 | Greenish Blue | [0.4444, 0.4848) |
| 8 | Cyan | [0.4848, 0.5152) |
| 9 | Dark Cyan | [0.5152, 0.5657) |
| 10 | Light Blue | [0.5657, 0.6263) |
| 11 | Blue | [0.6263, 0.7475) |
| 12 | Pinkish Blue | [0.7475, 0.7778) |
| 13 | Bluish Pink | [0.7778, 0.8283) |
| 14 | Pink | [0.8283, 0.8990) |
| 15 | Pinkish Red | [0.8990, 0.9596) |

Figure 21:
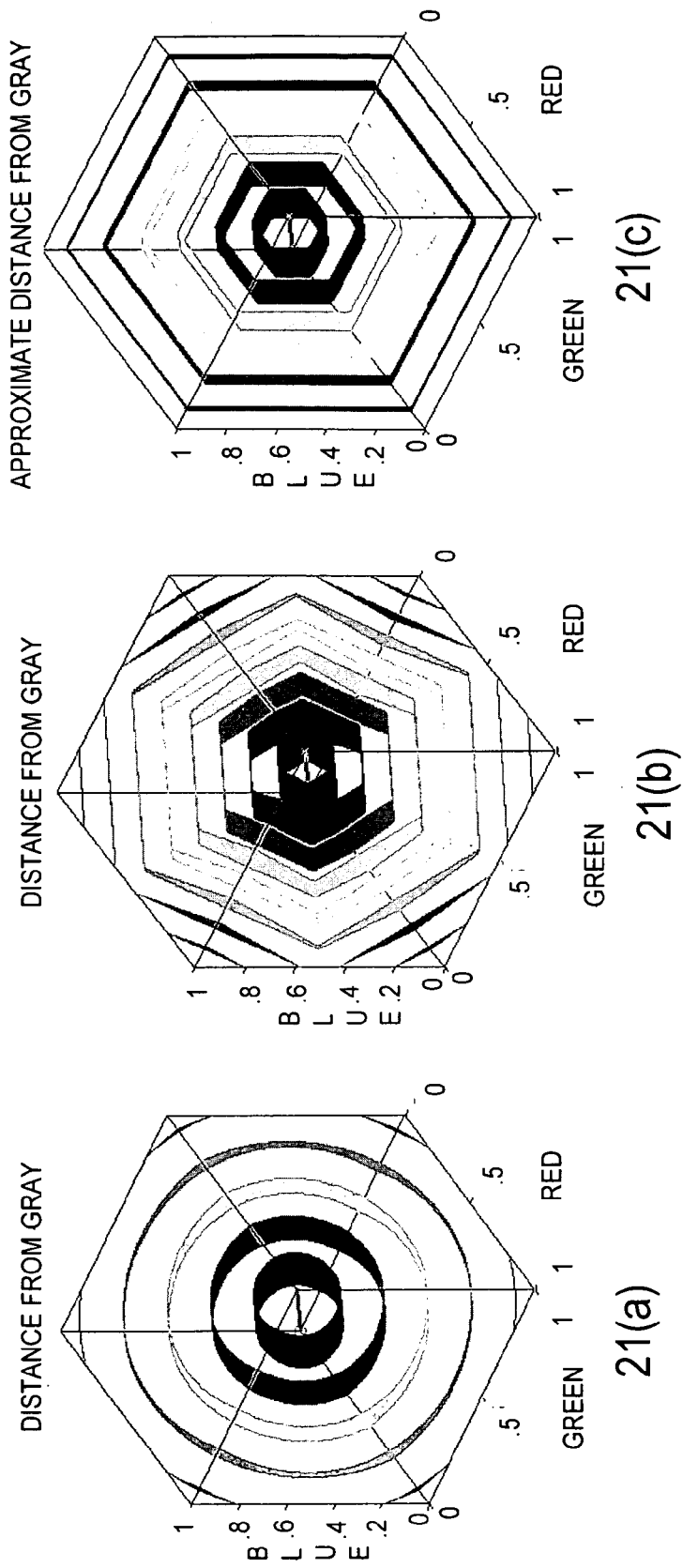
FIG. 21 illustrates an RGB-color cube.

FIG. 21 illustrates the RGB-color cube. The line connecting (0,0,0) and (1,1,1) is shown in pink. 21(a), 21(b), and 21(c) show the distance contour from this diagonal line for various metrics. These contours are shown in different colors (blue, cyan, green, yellow, orange, red).] Points that lie on the line connecting (0,0,0) and (1,1,1) in RGB color space are defined to be pure gray. Distance from this line is used as a confidence of color. 21(*a*) is Euclidean distance (2-norm) to the diagonal line $d_a=\sqrt{(r-t)^2+(g-t)^2+(b-t)^2}$, where $t=(r+g+b)/3$ (b) 1-norm $d_b=|r-t|+|g-t|+|b-t|$ 21(*c*) approximation that resembles 1-norm $d_{approx}=d_c=|r-g|+|g-b|+|b-r|$. The present embodiment utilizes option 21(*c*) due to its simplicity. Using fixed color prototypes is important since this is a non-statistical map and hence does not have bias based on number of sample of similar color.

Then the present embodiment will classify each hue based on color confidence 1904. Each hue bin is further subdivided based on color confidence. There are 5 uniformly spaced color-confidence bins.

Figure 22:
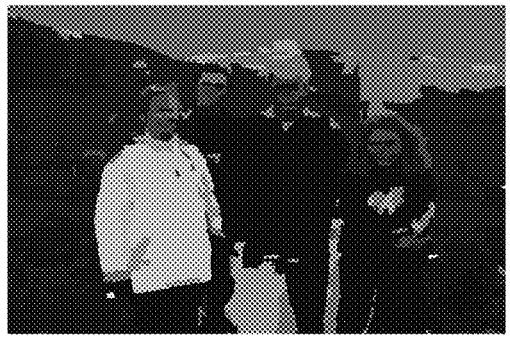
FIG. 22 illustrates the steps taken in classifying each hue group based on color confidence in which 22(a) represents labeled regions based on the color in a palette; 22(b) represents the common regions before and after projection; 22(c) represents regions added by a projection operation; 22(d) represents regions removed by a projection operation; 22(e) represents the mask after clean up of the projected mask; and 22(f) represents the corresponding regions in 22(e) in grey-scale.
Figure 22:
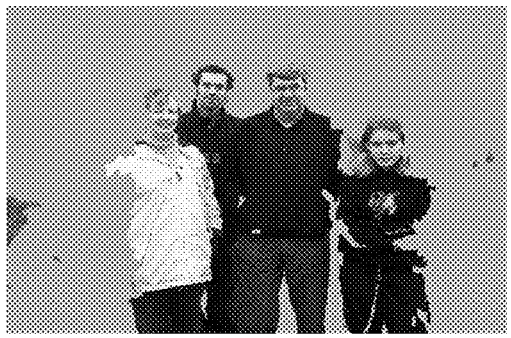
Figure 22:
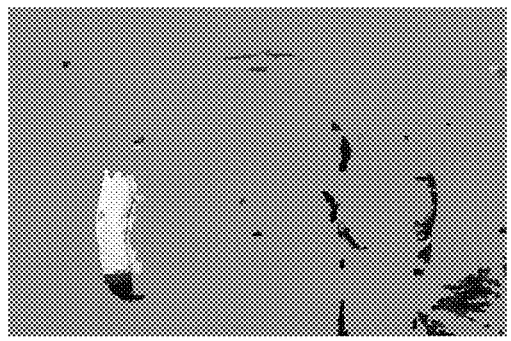
Figure 22:
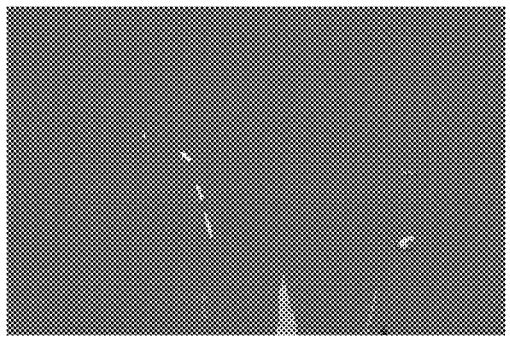
Figure 22:
Figure 22:
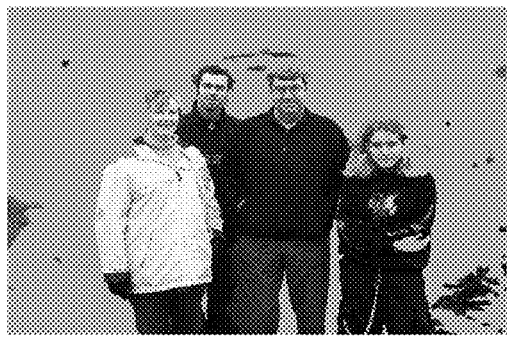

JigCut regions are considered to have the same color if they are quantized to the same color bin. It is unique to method for assigning color similarity. It is also computationally efficient since the present invention avoids calculating distance between every possible pairs of colors. FIG. 22 is provided as an illustration for 1904. It is based off of the original sample image found in 5(*a*). 22(*a*) represents labeled regions based on the color in the palette. 22(*b*) represents the common regions before and after projection. 22(*c*) represents regions added by the projection operation. 22(*d*) represents regions removed by the projection operation. 22(*e*) represents the mask after clean up of projected mask. 22(*e*) represents the mask after clean up of projected mask. 22(*f*) represents the corresponding regions in 22(*e*) in color. When complete, color palette and classification will have been reached 1905.

Figure 23:
FIG. 23 is an illustrative example of a conservative template for a face-torso template, in accordance with an embodiment of the present invention.
Figure 24:
FIG. 24 illustrates the processing of the original image from FIG. 5(a) to eliminate secondary blobs using distance from face rectangle(s) and rough people mask(s): 24(a) is the binary representation while 24(b) is the corresponding grey-scale representation.
Figure 24:
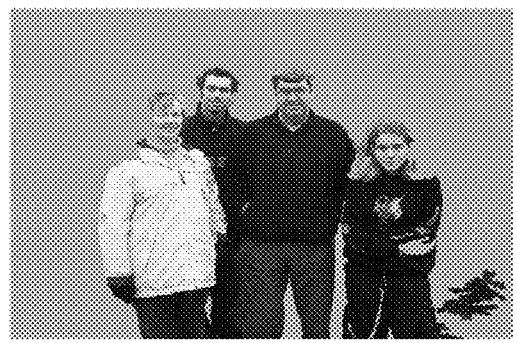

In the present embodiment for refine person/people map 110, the invention would then eliminate secondary blobs using distance from face rectangle(s) and rough people mask(s) 1603. The binary person mask at this stage may have more connected regions (blobs) than the number of people in the image. Also, it has a potential to have isolated blobs away from the main subjects (people). The present embodiment would identify primary blobs and eliminate secondary blobs that are too far away from all of the primary blobs. Primary blobs are identified by looking at the overlap of blobs with a face-torso map created by the intersection of the mask represented in FIG. 23. FIG. 23 is an illustrative example of a conservative template for the face-torso template. It is created by the union of the face rectangle and a rectangle immediately below it. The total height is three times the height of the face rectangle. Secondary blobs that are more than 10% of the smallest dimension of the image away from all of the primary blobs are eliminated. The effectiveness of this approach is evident in FIG. 24. In FIG. 24, the original image 5(*a*) has been processed to eliminate secondary blobs using distance from face rectangle(s) and rough people mask(s). 24(*a*) is the binary representation while 24(*b*) is the corresponding color representation.

Figure 25:
FIG. 25 illustrates the results of a blob removal routine in which the extraneous blob in binary from FIG. 24(a) is removed: 25(b) corresponds to 25(a) in grey-scale.
Figure 25:

In the present embodiment for refine person/people map 110, the invention would then remove isolated blobs based on size and distance from primary blobs 1604. In 1604, connected components are identified from the binary mask. Pixels that do not touch at least 4 other pixels are eliminated. This removes any stray pixels and serious roughness. The area of each of the remaining blobs is measured and Otsu's method ("A thresholding selection method from gray-level histogram", N. Otsu, IEEE Transactions on System, Man and Cybernetics, vol. 1, pp. 62-66, 1979) is used to threshold blob area in this embodiment. Blobs with area exceeding Otsu's threshold are considered primary blobs and are retained. Other blobs are eliminated. Include pixels from the original mask that are within 2 pixels from primary blob. FIG. 25 is provided to illustrate 1604. 25(*a*) shows the extraneous blob in binary from 24(*a*) is removed by 1604. 25(*b*) corresponds to 25(*a*) in color.

Figure 26:
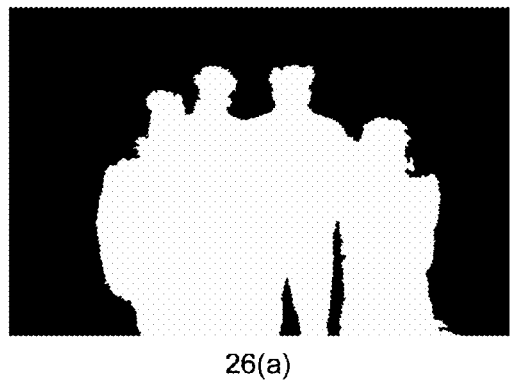
FIG. 26 illustrates the results of a hole identification and fill routine in which FIG. 26(a) displays the certain holes in FIG. 25(a) filed based on the routine, where FIG. 26(b) corresponds to FIG. 26(a) in grey-scale.
Figure 26:

In the present embodiment for refine person/people map 110, the invention would then identify holes in mask and fill holes of certain size 1605. Due to application of thresholds and variation in luminance and saturation of colors there is a possibility of holes in the mask. These holes are identified and their area is measured. Larger holes are retained and smaller ones are filled. The size and location of face is used to determine the size threshold for each hole. A conservative threshold is half the area of the smallest face. FIG. 26 is provided to illustrate 1605. FIG. 26(*a*) displays the certain holes in FIG. 25(*a*) filed based on 1605. FIG. 26(*b*) corresponds to FIG. 26(*a*) in color.

After the present embodiment has refined the person/people map 110, the present invention will have essentially reached its goal of having created a segmentation of person/people 111.

Figure 29:
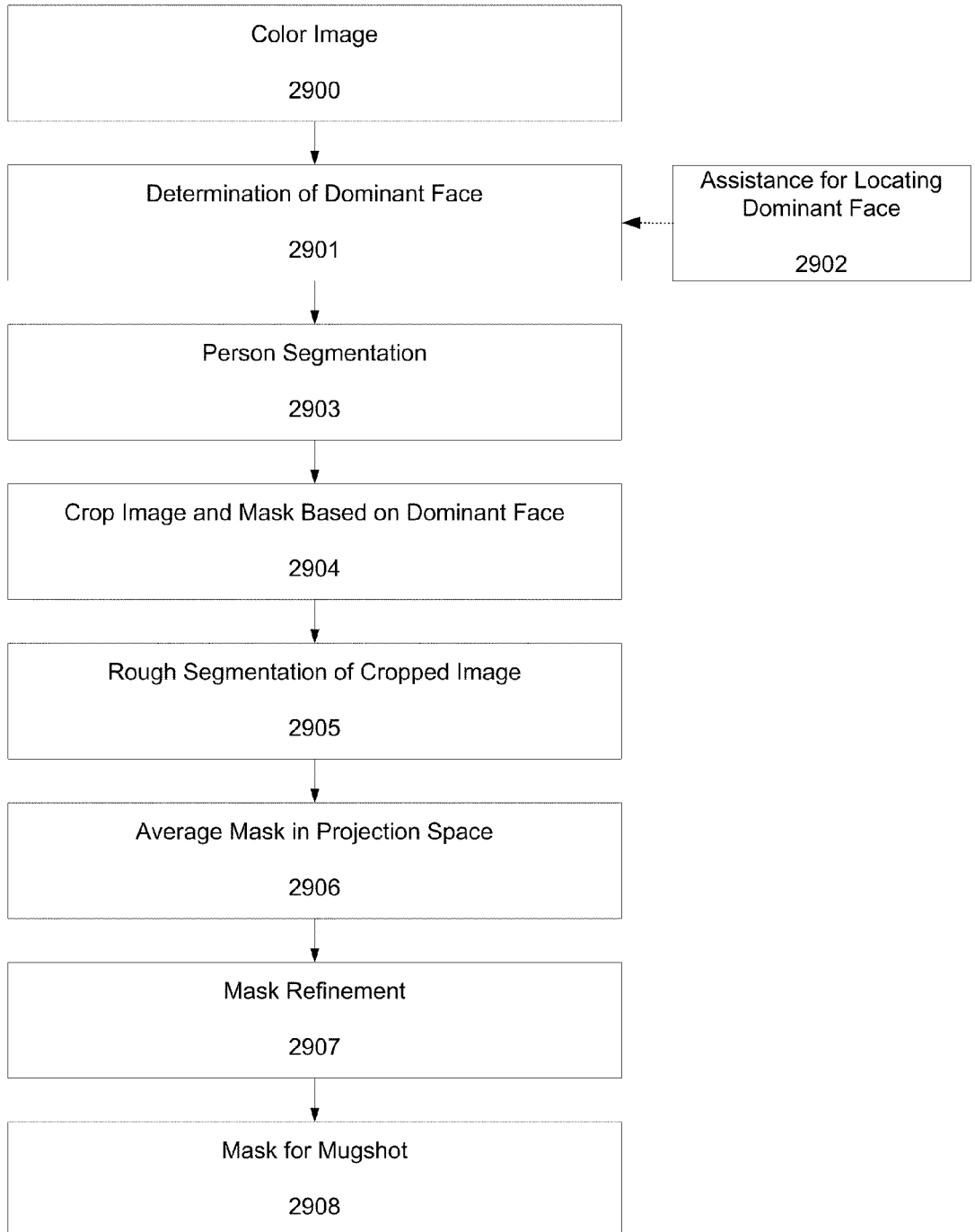
FIG. 29 is a diagrammatic illustration of a system, process or method for segmentation of an image of a person or persons to produce a mugshot.

FIG. 29 is a diagrammatic illustration of a system, process or method for segmentation of an image of a person or persons to get mugshot. "Mugshot" may be defined as an image of a person showing the person's face and optionally the upper torso area of the body. As illustrated in the exemplary embodiment of FIG. 29, a color image 2900 is selected or provided and processed at 2901 for determination of a dominant face within the image 2900. The detection of faces can comprise any conventional way of detecting faces, including the systems, processes, and methods illustrated in the previous embodiments described in this specification, namely the exemplary embodiments and their variations illustrated in FIGS. 1, 2, and 4. In the cases where many faces are detected, rules may be utilized to determine which of the faces is considered dominant. The rules may be based on size and centeredness of each face. For example, the largest face that is centered may be selected. One face must be determined as the dominant face.

Optionally, assistance for locating the dominant face may be utilized to determine the dominant face as illustrated in FIG. 29 at 2902. The dominant face may be selected by a user, or hinted by the user. If a face is selected or hinted at, the face that is detected that closely, if not completely, falls within the selection or hint will be determined to the dominant face. In one embodiment, if there are multiple people in an image, the user is given a choice to select the person for mugshot, or the embodiment will autonomously pick the person for mugshot.

Figure 30:
FIG. 30 is a sample image provided to assist illustration of the exemplary embodiment of FIG. 29.
Figure 31:
FIG. 31 is the sample image from FIG. 30 wherein the dominant face is shown within the smaller square and the region to be cropped for mugshot is shown within the bigger square.

FIG. 30 is a sample image provided to assist illustration of the exemplary embodiment of FIG. 29. FIG. 31 is the sample image from FIG. 30 wherein the dominant face is shown within the smaller square and the region to be cropped for mugshot is shown within the bigger square. The region to be cropped may be any size ranging from the pixels comprising the entire image to pixels comprising the face of the person. Preferably, the region to be cropped will comprise at least the entire head of the person whose face is determined, selected, or deemed dominant.

Figure 32:
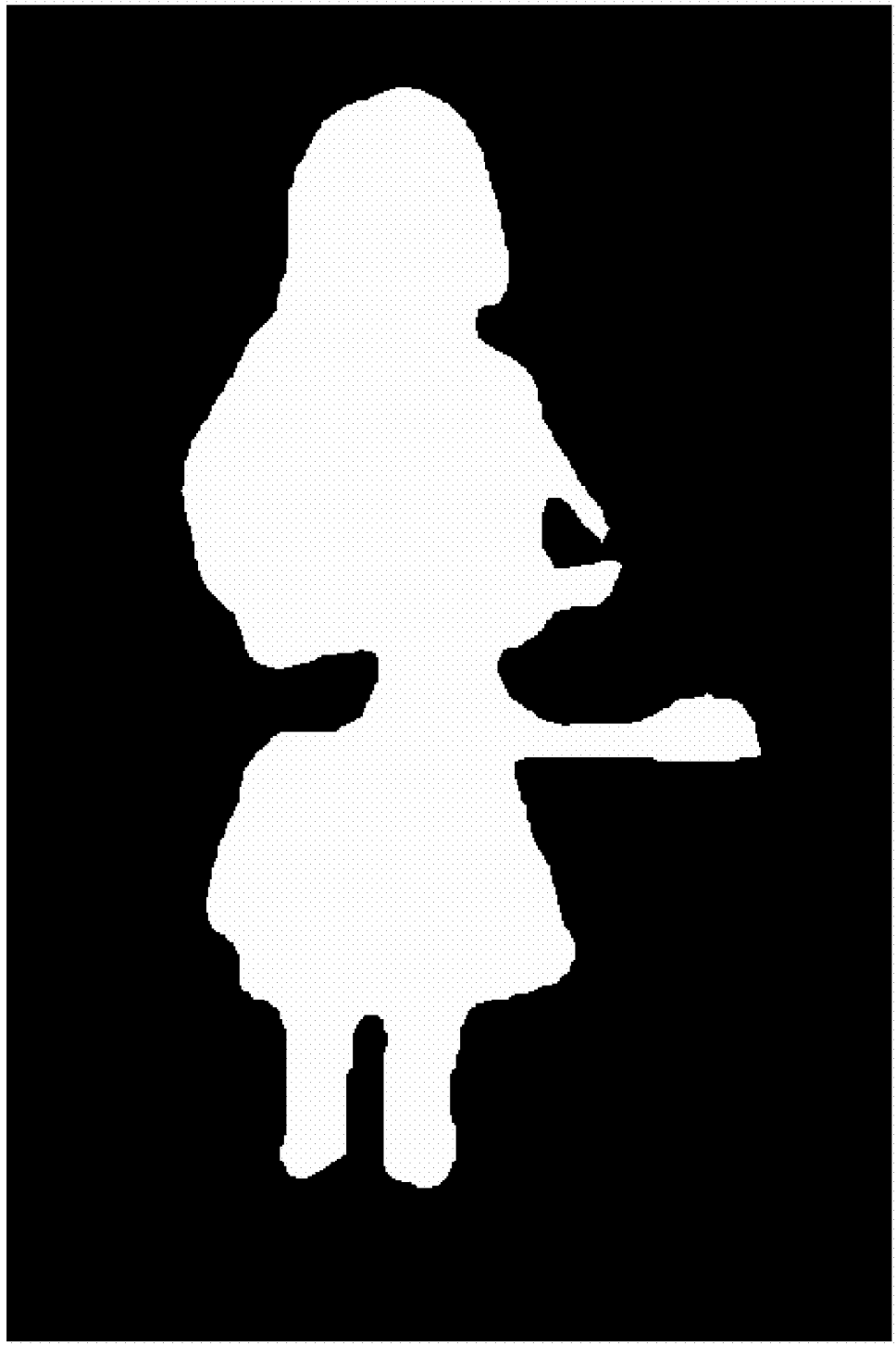
FIG. 32 is a sample resulting binary mask after a person segmentation process of the image in FIG. 30.
Figure 33:
FIG. 33 is the resulting image created by replacing the data of the mask of FIG. 32 with the original image data from FIG. 30 accordingly.

As illustrated in the exemplary embodiment in FIG. 29, a person segmentation process at 2903 of the entire image occurs. A person segmentation process may occur through processes and sub-processes mentioned in the exemplary embodiments illustrated by FIGS. 1-28. As desired, the original image is scaled down to working pixel resolution before person segmentation process and the final mask may be scaled back to the image's original dimensions. Applying the person segmentation process at 2903 to the entire image, rather than just the cropped image, more information regarding the background can be gathered. This information can later be used for further mask refinement. In an alternative embodiment, the person segmentation process may be applied to the person who's face is determined to be dominant at 2901. FIG. 32 is a sample resulting binary mask after a person segmentation process of the image in FIG. 30. FIG. 33 is the resulting image created by replacing the data of the mask of FIG. 32 with the original image data from FIG. 30 accordingly.

Figure 34:
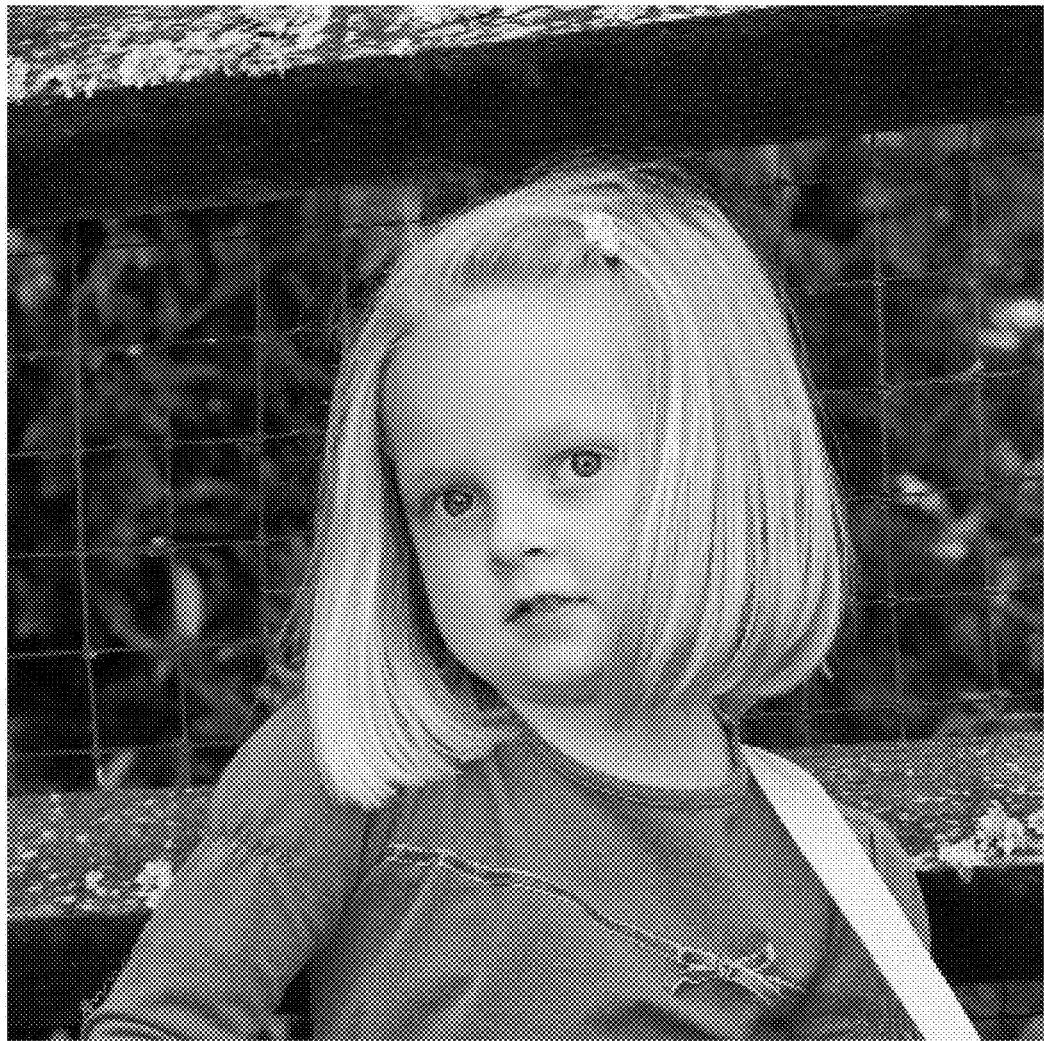
FIG. 34 is an exemplary image with the dominant face and local region cropped from the sample image from FIG. 30.
Figure 35:
FIG. 35 is the sample resulting binary mask cropped to the same region size and location as the exemplary image of FIG. 34.
Figure 36:
FIG. 36 is the resulting image created by replacing the data of the mask of FIG. 35 with the original image data from FIG. 30 or from the data of the exemplary image in FIG. 34 accordingly.

After person segmentation processing, the original image and mask created by the person segmentation process at 2903 are cropped to a desired region at 2904. As mentioned above, the region to be cropped may be any size from the original image. As desired, the region cropped is the region near the dominant face. Optionally, the estimated size and location of the dominant face is used to crop the original image. In an additional embodiment, the cropped region is resized. FIG. 34 is an exemplary image with the dominant face and local region cropped from the sample image from FIG. 30. FIG. 35 is the sample resulting binary mask cropped to the same region size and location as the exemplary image of FIG. 34. FIG. 36 is the resulting image created by replacing the data of the mask of FIG. 35 with the original image data from FIG. 30 or from the data of the exemplary image in FIG. 34 accordingly.

Figure 37:
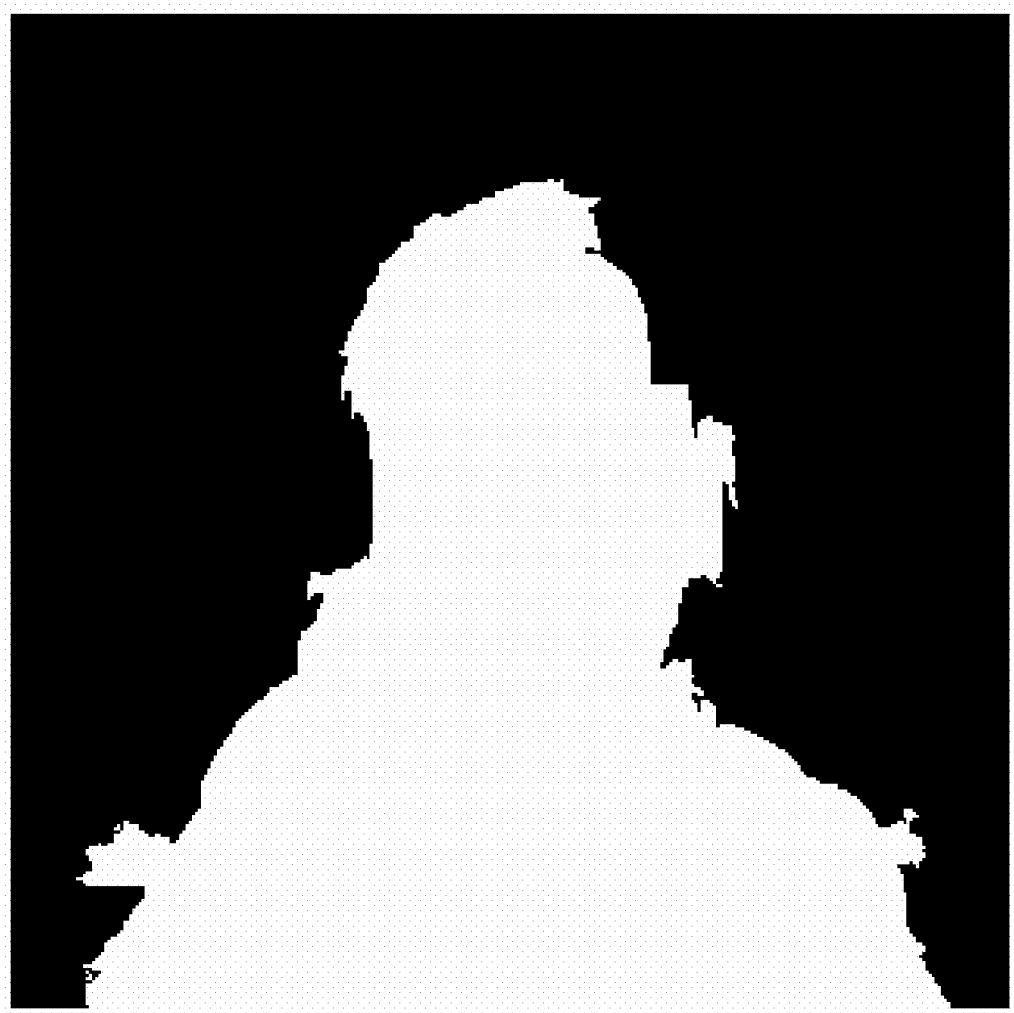
FIG. 37 is the sample cropped resulting binary mask from FIG. 35 after a rough segmentation process.
Figure 38:
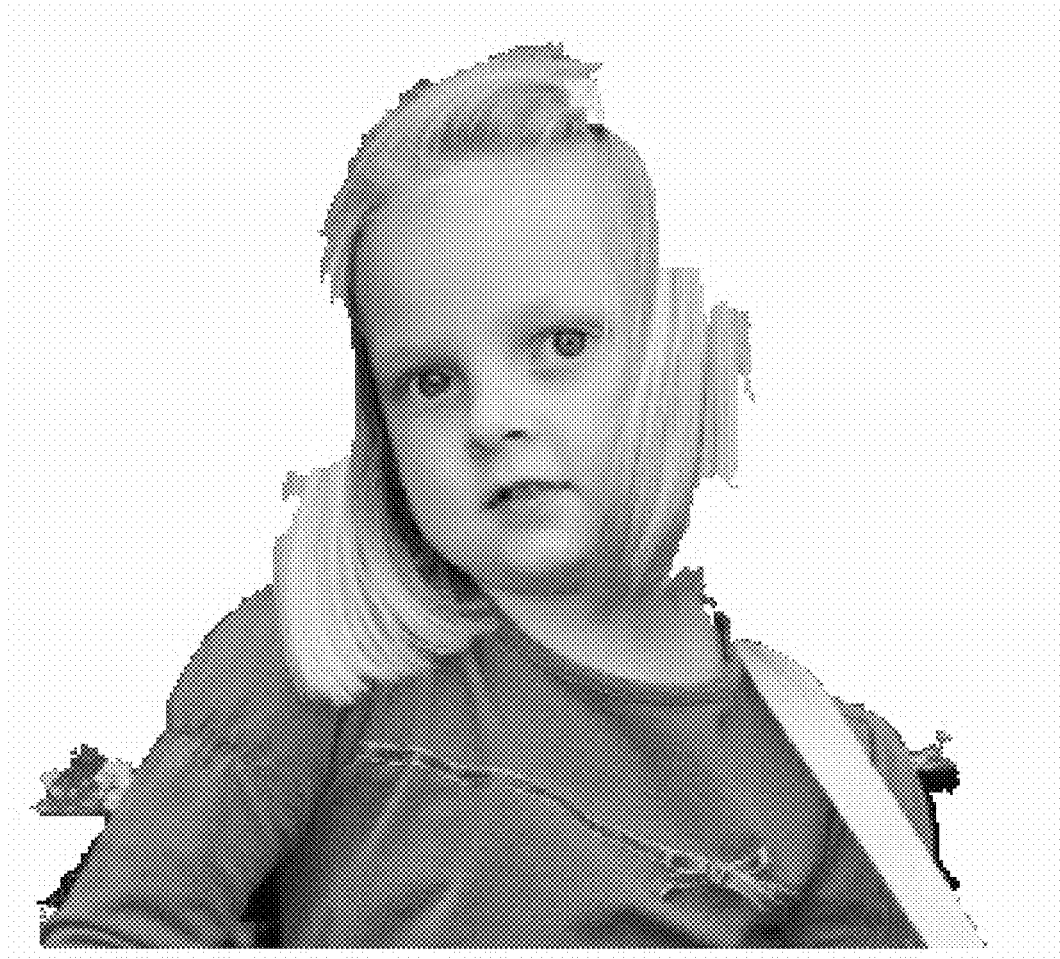
FIG. 38 is the resulting image created by replacing the data of the mask of FIG. 37 with the data from the exemplary image in FIG. 34 accordingly.

Once the original image and mask are cropped based on the determination of the dominant face, the cropped image is processed for a rough segmentation at 2905. As desired, the cropped image is scaled down to a working pixel resolution. Optionally, the location and size of the dominant face is transformed according to the rescaled cropped image. The process to create a rough segmentation of the cropped image at 2905 may occur utilizing the processes and sub-processes for person segmentation mentioned in the exemplary embodiments illustrated by FIGS. 1-28. FIG. 37 is the sample cropped resulting binary mask from FIG. 35 after a rough segmentation process. FIG. 38 is the resulting image created by replacing the data of the mask of FIG. 37 with the data from the exemplary image in FIG. 34 accordingly.

Figure 39:
FIG. 39 is a sample average mask in projection space created by utilizing the projection coefficients from the masks in FIG. 33 and FIG. 35.
Figure 40:
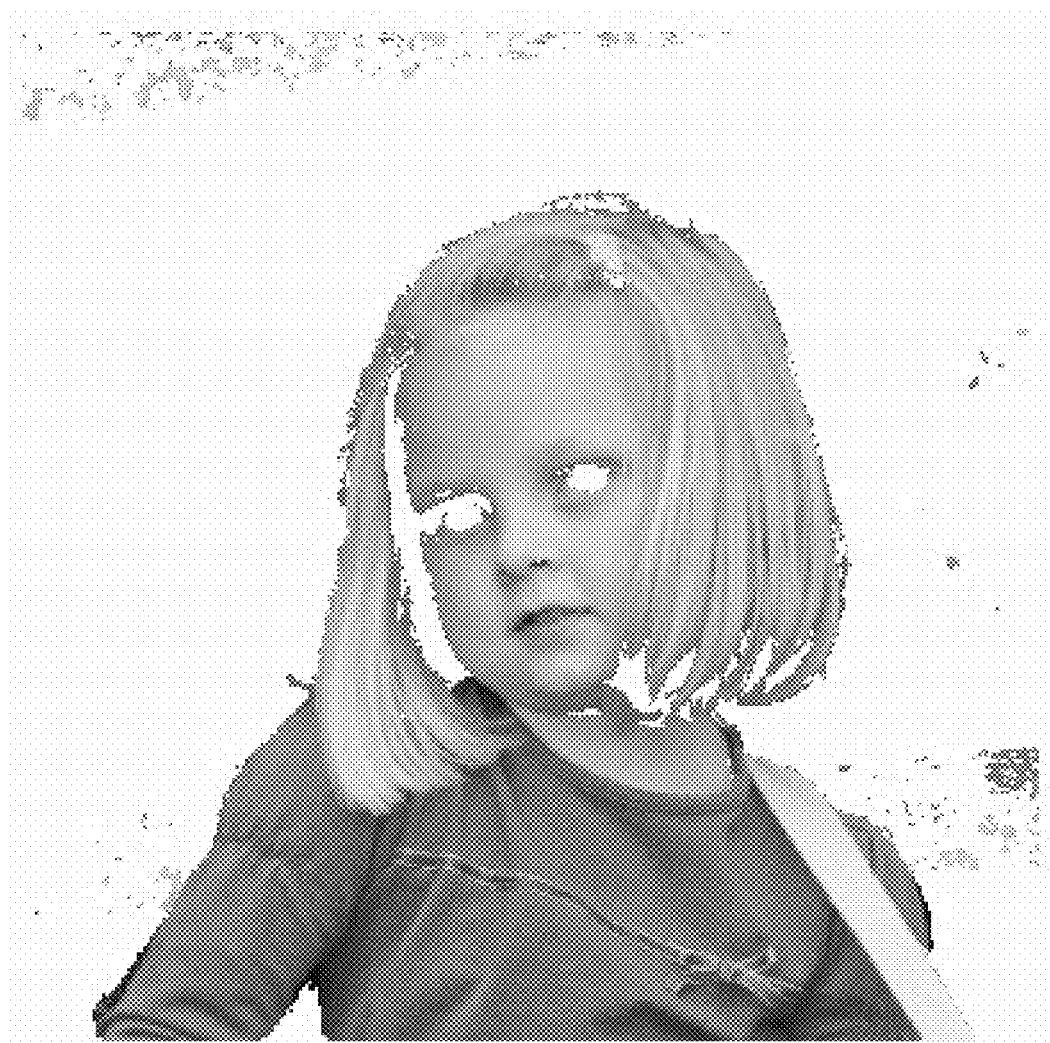
FIG. 40 is the resulting image created by replacing the data of the mask of FIG. 39 with the data from the exemplary image in FIG. 34 accordingly.

As illustrated in the exemplary embodiment of FIG. 29, a process to create an average mask in projection space then occurs at 2906. This process identifies the projection coefficients utilizing the Least Squares approach for the given mask. Projection coefficients are determined for the masks created at 2904 and 2905. It should be noted that there are many other processes for integrating the two masks including, but not limited to, union of masks, intersection of masks, average of masks, and weighted least squares using one mask to derive weights. The average of the coefficients obtained from the masks created at 2904 and 2905 is utilized to create the average mask in projection space. FIG. 39 is a sample average mask in projection space created by utilizing the projection coefficients from the masks in FIG. 33 and FIG. 35. FIG. 40 is the resulting image created by replacing the data of the mask of FIG. 39 with the data from the exemplary image in FIG. 34 accordingly.

Figure 41:
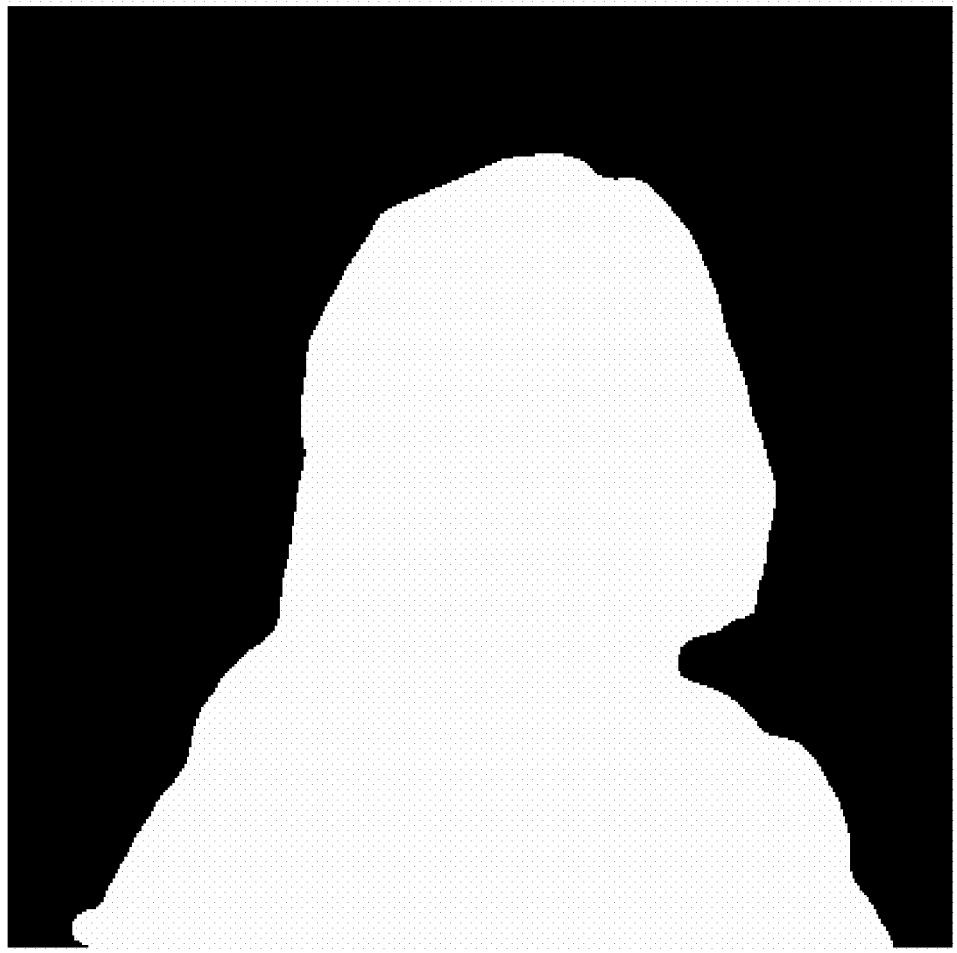
FIG. 41 is the sample average mask in projection space from FIG. 39 after a refinement process.
Figure 42:
FIG. 42 is the resulting image created by replacing the data of the mask of FIG. 41 with the data from the exemplary image in FIG. 34 accordingly.

Optionally, the average mask is then refined utilizing approaches described in R2 and scaled back up to the original resolution to get the final mask. The refinement of the mask is illustrated in FIG. 29 at 2907. After refinement, the resulting mask for mugshot is created, as illustrated at 2908 of FIG. 29. FIG. 41 is the sample average mask in projection space from FIG. 39 after a refinement process. FIG. 42 is the resulting image created by replacing the data of the mask of FIG. 41 with the data from the exemplary image in FIG. 34 accordingly.

Figure 43:
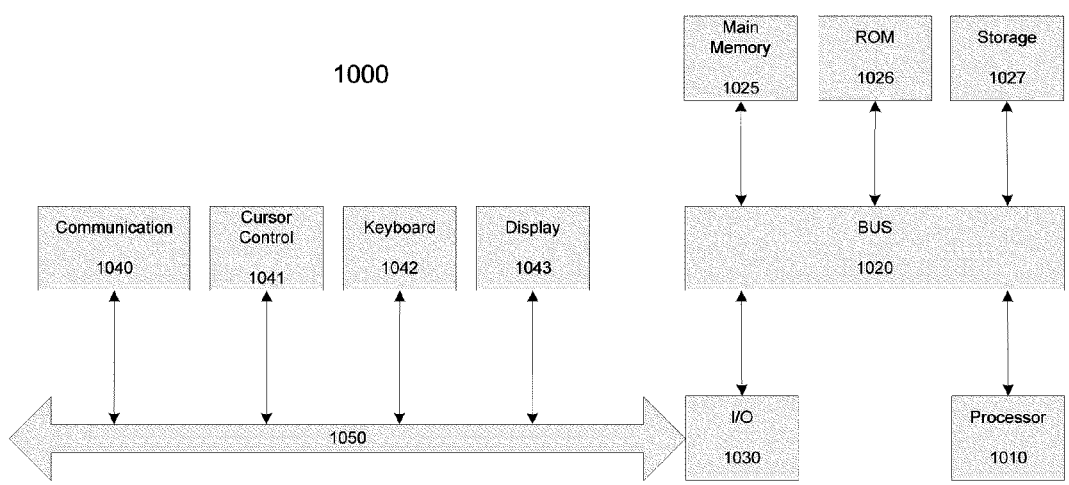
FIG. 43 is an illustration of an exemplary computer architecture for use with the present system, according to one embodiment.

FIG. 43 is an illustration of an exemplary computer architecture for use with the present system, according to one embodiment. Computer architecture 1000 is used to implement the computer systems or image processing systems described in various embodiments of the invention. One aspect of the present disclosure provides a computer system, such as exemplary computer architecture 1000, for implementing any of the methods disclosed herein. One embodiment of architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 is used to store temporary variables or other intermediate information during execution of instructions by processor 1010. Architecture 1000 includes a read only memory (ROM) and/or other static storage device 1026 coupled to bus 1020 for storing static information and instructions used by processor 1010.

A data storage device 1027 such as a magnetic disk or optical disk and its corresponding drive is coupled to computer system 1000 for storing information and instructions. Architecture 1000 is coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

The communication device 1040 is for accessing other computers (servers or clients) via a network. The communication device 1040 may comprise a modem, a network interface card, a wireless network interface, or other well known interface device, such as those used for coupling to Ethernet, token ring, or other types of networks.

The disclosure is susceptible to various modifications and alternative forms, and specific examples thereof have been shown by way of example in the drawings and are herein described in detail. It should be understood, however, that the disclosure is not to be limited to the particular forms or methods disclosed, but to the contrary, the disclosure is to cover all modifications, equivalents, and alternatives. In particular, it is contemplated that functional implementation of the disclosed embodiments described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of the disclosed embodiments not be limited by this detailed description, but rather by the claims following.

What is claimed:

1. A method of segmenting a digital image of a person, said method comprising:
   detecting a face of said person, wherein said digital image is stored on a memory component;
   detecting a skin of said digital image;
   determining at least one body dimension of said person based on dimensions of said detected face to form at least one body map;
   refining said at least one body map;
   placing pixels of said refined at least one body map in a particular group of a color space by applying a Least-Square; and
   outputting said at least one body map, wherein said outputting is subsequent to said refining.

2. The method as described by claim 1, wherein said face is detected by applying a hierarchical rule.

3. The method as described by claim 1, wherein said skin detection comprises:
generating color histograms using nonparametric approach.

4. The method as described by claim 1, wherein said skin detection comprises:
applying a parametric approach using at least one Gaussian model.

5. The method as described by claim 1, wherein said skin detection is pixel based.

6. The method as described by claim 1 further comprising:
generating a binary skin map by applying a threshold to probabilities associated with said skin.

7. The method as described by claim 1, wherein said face detection comprises:
detecting one or more faces using Haar-based classifier;
resolving duplicate faces; and
in response to making no face detection, tilting said digital image.

8. The method as described by claim 1, wherein said face detection comprises:
applying at least one of an eye map or mouth map to said digital image.

9. The method as described by claim 1 further comprising:
refining said detecting said face.

10. The method as described by claim 9, wherein said refining comprises:
determining whether a difference between a maximum and minimum luminance within said face is greater than a certain threshold; and
in response to determining that said difference is greater than said certain threshold, confirming that said detected face is in fact a face in said digital image.

11. The method as described by claim 9 further comprising:
refining skin of said at least one body map.

12. The method as described by claim 11, wherein said refining said skin of said at least one body map comprises:
applying gamma correction to said at least one body map.

13. The method as described by claim 1, wherein said refining said at least one body map comprises:
identifying holes that are smaller than a given hole, wherein said given hole is determined based on a size and location of said face; and
filling said identified holes.

14. The method as described by claim 1 further comprising:
determining a dominant face in said digital image; and
cropping said digital image based on said dominant face.

15. The method as described by claim 14, wherein said dominant face is determined based on a user input.

16. The method as described by claim 14, wherein said determining said dominant face is based on size and centeredness of said face.

17. A non-transitory computer readable storage medium having computer-readable program code stored thereon for causing a processor to implement a method comprising:
detecting a face of a person in a digital image, wherein said digital image is stored on a memory component;
detecting a skin of said digital image;
determining at least one body dimension of said person based on dimensions of said detected face to form at least one body map;
refining said at least one body map;
placing pixels of said refined at least one body map in a particular group of a color space by applying a Least-Square; and
outputting said at least one body map, wherein said outputting is subsequent to said refining.

18. A computer system comprising:
a processor;
a display; and
a memory coupled to said processor and said display, wherein said memory comprises computer-readable program code stored thereon for causing said processor to implement a method comprising:
detecting a face of a person in a digital image stored on a memory component;
detecting a skin of said digital image;
determining at least one body dimension of said person based on dimensions of said detected face to form at least one body map;
refining said at least one body map;
placing pixels of said refined at least one body map in a particular group of a color space by applying a Least-Square; and
outputting said at least one body map, wherein said outputting is subsequent to said refining.

19. The non-transitory computer readable storage medium as described by claim 17, wherein said face is detected by applying a hierarchical rule.

20. The computer system as described by claim 18, wherein said skin detection is pixel based.

* * * * *